US 012555624B2

(12) United States Patent
Du et al.

(10) Patent No.: US 12,555,624 B2
(45) Date of Patent: Feb. 17, 2026

(54) DECODER CIRCUITS, MEMORY DEVICES AND ITS CONTROL METHOD

(71) Applicant: YANGTZE MEMORY TECHNOLOGIES CO., LTD., Wuhan (CN)

(72) Inventors: Zhichao Du, Wuhan (CN); Xuesong Shen, Wuhan (CN); Daesik Song, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 123 days.

(21) Appl. No.: 18/392,745

(22) Filed: Dec. 21, 2023

(65) Prior Publication Data

US 2025/0174266 A1 May 29, 2025

(30) Foreign Application Priority Data

Nov. 28, 2023 (CN) .......................... 202311618712.5

(51) Int. Cl.
| | |
|---|---|
| G11C 8/00 | (2006.01) |
| G11C 11/408 | (2006.01) |
| G11C 11/4091 | (2006.01) |
| H01L 23/00 | (2006.01) |
| H01L 25/065 | (2023.01) |
| H01L 25/18 | (2023.01) |
| H10B 80/00 | (2023.01) |

(52) U.S. Cl.
CPC ...... *G11C 11/4087* (2013.01); *G11C 11/4091* (2013.01); *H01L 24/08* (2013.01);
(Continued)

(58) Field of Classification Search
CPC . G11C 11/4087; G11C 11/4091; H10B 80/00; H01L 24/08; H01L 25/0657;
(Continued)

(56) References Cited

U.S. PATENT DOCUMENTS

| | | | |
|---|---|---|---|
| 6,243,318 B1 * | 6/2001 | Yoshihara | G11C 8/10 |
| | | | 365/230.06 |
| 6,262,926 B1 * | 7/2001 | Nakai | G11C 16/08 |
| | | | 365/201 |

(Continued)

FOREIGN PATENT DOCUMENTS

KR 940005695 B1 * 6/1994 ............. G11C 16/06

*Primary Examiner* — Viet Q Nguyen
(74) *Attorney, Agent, or Firm* — BAYES PLLC

(57) ABSTRACT

Decoder circuit, memory device, and control method are disclosed. The decoder circuit includes a decoding circuit and a power supply control circuit including: a first transistor, its input is connected to a low-level voltage node, and its output outputs a first ground voltage; a second transistor, its input is connected to a high-level voltage node, and its output outputs a first voltage; and a reverse circuit, its input receives a semiconductor component enabling signal, and its output is connected to the control terminal of one of the first or second transistor; and the control terminal of the first or second transistor not connected to the reverse circuit receives the semiconductor component enabling signal. The decoding circuit includes sub-circuits, wherein a power supply interface of sub-circuit is connected to the output of second transistor, or a grounding interface of sub-circuit is connected to the output of first transistor.

20 Claims, 12 Drawing Sheets

(52) U.S. Cl.
CPC .......... *H01L 25/0657* (2013.01); *H01L 25/18* (2013.01); *H10B 80/00* (2023.02); *H01L 2224/08145* (2013.01); *H01L 2924/1431* (2013.01); *H01L 2924/1436* (2013.01)

(58) Field of Classification Search
CPC ........... H01L 25/18; H01L 2224/08145; H01L 2924/1431; H01L 2924/1436
USPC ..................................................... 365/230.06
See application file for complete search history.

(56) References Cited

U.S. PATENT DOCUMENTS

| | | | |
|---|---|---|---|
| 6,381,173 B1 * | 4/2002 | Zatelli ................ | G11C 16/0433 365/185.23 |
| 6,466,510 B2 * | 10/2002 | Fischer .................... | G11C 8/10 365/230.06 |
| 6,842,394 B2 * | 1/2005 | Kanetani ................. | G11C 8/10 365/230.01 |
| 7,248,535 B2 * | 7/2007 | Chun ....................... | G11C 8/08 365/189.11 |
| 8,437,172 B2 * | 5/2013 | Fiorentino ............... | G11C 8/10 365/163 |
| 8,605,534 B2 * | 12/2013 | Lee .......................... | G11C 7/02 365/229 |
| 8,892,615 B2 * | 11/2014 | Kitamura ................ | H03M 7/24 708/204 |
| 8,942,041 B1 * | 1/2015 | Ha ..................... | G11C 16/3427 365/185.16 |
| 8,982,615 B2 * | 3/2015 | Conte ....................... | G11C 8/12 365/163 |
| 11,049,549 B2 * | 6/2021 | Mazzucchelli ........ | G11C 5/025 |

* cited by examiner

DECODER CIRCUITS, MEMORY DEVICES AND ITS CONTROL METHOD

CROSS-REFERENCE TO RELATED APPLICATIONS

The present application claims the benefit of priority to Chinese Application No. 202311618712.5, filed on Nov. 28, 2023, the content of which is incorporated herein by reference in its entirety.

TECHNICAL FIELD

The present disclosure relates to the field of semiconductors, relating to but not limited to, a decoder circuit, a memory device and its control method, and a memory system.

BACKGROUND

A memory device is a storage apparatus used in modern information technology to store information, such as a dynamic random access memory (DRAM), which can include a memory cell array and a peripheral circuit. The peripheral circuit can control the memory cell array and operate the memory cell array for read, write, or refresh operations.

SUMMARY

According to some aspects of the present disclosure, a decoder is provided. The decoder may include a power supply control circuit including a first transistor, a second transistor, and a reverse circuit. An input terminal of the first transistor may be connected to a low-level voltage node, and an output terminal of the first transistor outputs a first ground voltage. An input terminal of the second transistor may be connected to a high-level voltage node, and an output terminal of the second transistor outputs a first voltage. An input terminal of the reverse circuit may receive a semiconductor component enabling signal, and an output terminal of the reverse circuit may be connected to a control terminal of one of the first transistor or the second transistor. The control terminal of the first transistor or the second transistor that is not connected to the reverse circuit may receive the semiconductor component enabling signal. The decoder may include a decoding circuit including sub-circuits. A power supply interface of one of sub-circuit of the sub-circuits may be connected to the output terminal of the second transistor, or a grounding interface of the one sub-circuit of the sub-circuits may be connected to the output terminal of the first transistor.

In some implementations, the -circuits may include at least one of a first sub-circuit or a second sub-circuit. In some implementations, an output interface of the first sub-circuit may output a low-level voltage, the power supply interface of the sub-circuit may be connected to the output terminal of the second transistor, and the grounding interface may be connected to the low-level voltage node. In some implementations, the output interface of the second sub-circuit may outputs a high-level voltage, the grounding interface of one of sub-circuit of the sub-circuits may be connected to the output terminal of the first transistor, and the power supply interface may be connected to the high-level voltage node.

In some implementations, the first transistor may be an N-type transistor and the second transistor may be a P-type transistor.

In some implementations, the control terminal of the second transistor may be connected to the output terminal of the reverse circuit, and the control terminal of the first transistor may receive the semiconductor component enabling signal. In some implementations, the semiconductor component enabling signal may indicate that the semiconductor component is at a high-level voltage when the semiconductor component is in an enabled state.

In some implementations, the control terminal of the first transistor may be connected to the output terminal of the reverse circuit, and the control terminal of the second transistor receives the semiconductor component enabling signal. In some implementations, the semiconductor component enabling signal may indicate that the semiconductor component is at a low-level voltage when the semiconductor component is in an enabled state.

According to another aspect of the present disclosure, a memory device is provided. The memory device may include a memory cell array and a peripheral circuit coupled to the memory cell array. The memory cell array may include a memory block which has word lines, bit lines, and memory cells coupled between the word lines and the bit lines. The peripheral circuit may include a column decoder circuit corresponding to the memory block. The column decoder circuit may be coupled to the bit lines in a corresponding memory block, and configured to receive a column address signal, decode the column address signal, and output a column selection signal. The column selection signal may indicate to activate a corresponding bit line of the memory block in an enabled state. During a decoding process, for the memory block in the enabled state, a power supply interface and a grounding interface of each sub-circuit in the column decoder circuit may be both powered normally, and for the memory block in a non-enabled state, one of the power supply interface or the grounding interface of each sub-circuit in the column decoder circuit may be floated according to a predetermined regularity.

In some implementations, the column decoder circuit may include a power supply control circuit including an input interface, a first output interface, and a second output interface. In some implementations, the input interface receives a memory block enabling signal, the first output interface outputs a first voltage, and the second output interface outputs a first ground voltage. In some implementations, when the memory block enabling signal indicates that the memory block is in the enabled state, the first output interface may be connected to a high-level voltage node, and the second output interface may be connected to a low-level voltage node, and when the memory block enabling signal indicates that the memory block may be in the non-enabled state, both the first voltage and the first ground voltage are floated. In some implementations, a decoding circuit including sub-circuits, each of which includes a power supply interface, a grounding interface, and an output interface. In some implementations, the power supply interface of the sub-circuit receives the first voltage or the grounding interface receives the first ground voltage, and the output interface of the sub-circuit outputs a corresponding fixed level voltage when the memory block enabling signal indicates that the memory block is in the non-enabled state.

In some implementations, the power supply control circuit may include a first transistor, a second transistor, and a reverse circuit. In some implementations, an input terminal of the first transistor may be connected to a low-level voltage node, and an output terminal of the first transistor may output a first ground voltage. In some implementations, an input terminal of the second transistor may be connected to the high-level voltage node, and an output terminal of the second transistor may output the first voltage. In some implementations, an input terminal of the reverse circuit may receive the memory block enabling signal, and an output terminal of the reverse circuit may be connected to the control terminal of one of the first transistor or the second transistor. In some implementations, the control terminal of the first transistor or the second transistor that is not connected to the reverse circuit may receive the memory block enabling signal.

In some implementations, the sub-circuits may include at least one of a first sub-circuit or a second sub-circuit. In some implementations, the output interface of the first sub-circuit outputs a low-level voltage, and the power supply interface of the first sub-circuit may be connected to the output terminal of the second transistor, and an grounding interface of the first sub-circuit may be connected to the low-level voltage node. In some implementations, the output interface of the second sub-circuit may output a high-level voltage, and the grounding interface of the second sub-circuit may be connected to the output terminal of the first transistor, and an power supply interface of the second sub-circuit may be connected to the high-level voltage node.

In some implementations, the first transistor may be an N-type transistor and the second transistor is a P-type transistor.

In some implementations, the control terminal of the second transistor may be connected to the output terminal of the reverse circuit, and the control terminal of the first transistor may receive the memory block enabling signal.

In some implementations, the memory block enabling signal may indicate that the memory block is at a high-level voltage when the memory block is in the enabled state.

In some implementations, the control terminal of the first transistor may be connected to the output terminal of the reverse circuit, and the control terminal of the second transistor may receive the memory block enabling signal. In some implementations, the memory block enabling signal may indicate that the memory block is at a low-level voltage when the memory block is in the enabled state.

In some implementations, the decoding circuit includes a control signal generation circuit and an address enabling generation circuit. In some implementations, the control signal generation circuit may be coupled to the power supply control circuit, and may be configured to generate at least a local data line read control signal and a local data line write control signal. In some implementations, the address enabling generation circuit may be coupled to the power supply control circuit, and may be configured to receive a column address signal and a memory block enabling signal and generate a column selection signal corresponding to each bit line using the column address signal and the memory block enabling signal.

In some implementations, the peripheral circuit may further include a sensing amplification circuit and a local data line control circuit. In some implementations, the local data line control circuit may be coupled with the column decoder circuit, may be coupled with the sensing amplification circuit through a local data line, may be configured to receive the local data line read control signal and the local data line write control signal, and to control a data interaction direction between the local data line and a global data line using the local data line read control signal and the local data line write control signal. In some implementations, the sensing amplification circuit may be coupled with the column decoder circuit and coupled with a bit line in the memory cell array. In some implementations, the column decoder circuit may be further configured to control a data interaction between the local data line and the bit line using the column selection signal. In some implementations, the sensing amplification circuit may be configured to detect and amplify a voltage difference on the bit line.

In some implementations, the memory cell array may be arranged on a first semiconductor structure, and the peripheral circuit may be arranged on a second semiconductor structure. In some implementations, the first semiconductor structure and the second semiconductor structure may be stacked and electrically connected through bonding. In some implementations, each decoding circuit, and the sensing amplification circuit, the local data line control circuit, and a word line drive circuit corresponding to each memory block may be all positioned at a position of an orthogonal projection of the corresponding memory block on a plane where the second semiconductor structure is at.

In some implementations, the memory cell array may include memory banks, each of which includes several row memory blocks and several column memory blocks. In some implementations, the column decoder circuit may further include a preliminary decoding circuit configured to receive a preliminary column address signal, perform decoding processing, and output the column address signal. In some implementations, a number of transmission lines corresponding to the preliminary column address signal may be smaller than a number of transmission lines corresponding to the column address signal. In some implementations, each of the memory banks corresponds to preliminary decoding circuits, power supply control circuits, and decoding circuits, each preliminary decoding circuit may correspond to a column of memory blocks, and each power supply control circuit and decoding circuit may correspond to a memory block in the column of memory blocks.

In some implementations, the memory device may include a dynamic random access memory.

According to a further aspect of the present disclosure, a memory system is provided. The memory system may include one or more memory devices each including a memory cell array and a peripheral circuit coupled to the memory cell array. The memory cell array may include a memory block which has word lines, bit lines and memory cells coupled between the word lines and the bit lines. The peripheral circuit may include a column decoder circuit corresponding to the memory block. The column decoder circuit may be coupled to the bit lines in a corresponding memory block, and may be configured to receive a column address signal, decode the column address signal, and output a column selection signal. The column selection signal may indicate to activate a corresponding bit line of the memory block in an enabled state. During a decoding process, for the memory block in the enabled state, a power supply interface and a grounding interface of each sub-circuit in the column decoder circuit may be both powered normally, and for the memory block in a non-enabled state, one of the power supply interface or the grounding interface of each sub-circuit in the column decoder circuit may be floated according to a predetermined regularity. The memory system may include a memory controller that is coupled to and controls the memory device.

In some implementations, the column decoder circuit includes a power supply control circuit including an input interface, a first output interface, and a second output interface. In some implementations, the input interface receives a memory block enabling signal, the first output interface outputs a first voltage, and the second output interface outputs a first ground voltage. In some implementations, when the memory block enabling signal may indicate that the memory block is in the enabled state, the first output interface may be connected to a high-level voltage node, and the second output interface may be connected to a low-level voltage node, and when the memory block enabling signal indicates that the memory block is in the non-enabled state, both the first voltage and the first ground voltage may be floated. In some implementations, a decoding circuit may include sub-circuits, each of which includes a power supply interface, a grounding interface, and an output interface. In some implementations, the power supply interface of the sub-circuit may receive the first voltage or the grounding interface may receive the first ground voltage, and the output interface of the sub-circuit outputs a corresponding fixed level voltage when the memory block enabling signal indicates that the memory block is in the non-enabled state.

In some implementations, the power supply control circuit may include a first transistor, a second transistor, and a reverse circuit. In some implementations, an input terminal of the first transistor may be connected to a low-level voltage node, and an output terminal of the first transistor may output a first ground voltage. In some implementations, an input terminal of the second transistor may be connected to the high-level voltage node, and an output terminal of the second transistor may output the first voltage. In some implementations, an input terminal of the reverse circuit may receive the memory block enabling signal, and an output terminal of the reverse circuit may be connected to the control terminal of one of the first transistor or the second transistor. In some implementations, the control terminal of the first transistor or the second transistor that is not connected to the reverse circuit may receive the memory block enabling signal.

According to yet another aspect of the present disclosure, a method of controlling a memory device is provided. The method may include, in response to a memory block being in an enabled state, inputting a first voltage and a first ground voltage to a column decoder circuit corresponding to the memory block to decode a column address signal and output a column selection signal. The column selection signal may indicate to activate a corresponding bit line of the memory block in the enabled state. The method may include, in response to the memory block being in a non-enabled state, at least one interface receiving the first voltage or the first ground voltage in the column decoder circuit corresponding to the memory block is floated according to a predetermined regularity.

In some implementations, the method may include inputting a memory block enabling signal to a power supply control circuit, and causing the power supply control circuit to output the first voltage and the first ground voltage to a decoding circuit in response to the memory block being in the enabled state, so that the decoding circuit to output a corresponding fixed level voltage. In some implementations, the method may include, in response to the memory block being in the non-enabled state, causing the first voltage and the first ground voltage to be floated so that the decoding circuit outputs the corresponding fixed level voltage.

Figure 1:
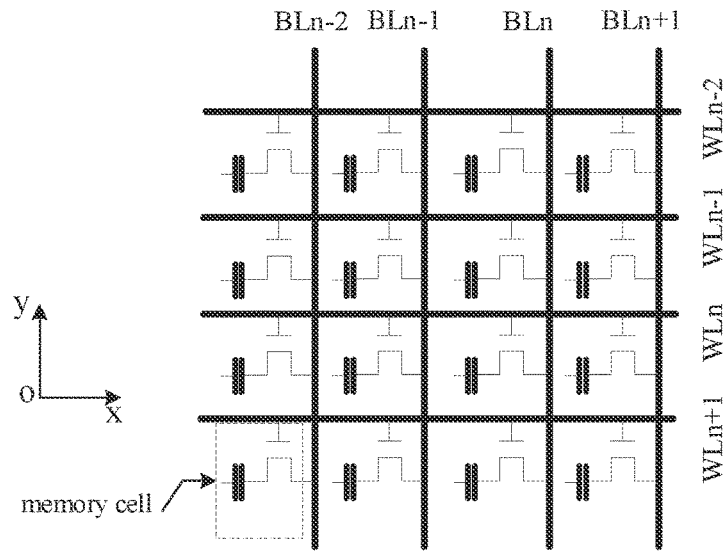
FIG. 1 is a schematic diagram of a memory cell array, according to some implementations of the present disclosure.

In the above drawings (which may not necessarily be drawn to scale), like reference numerals can describe like members in different views. Like reference numerals with different letter suffixes can represent different examples of like members. The accompanying drawings roughly illustrate the various implementations discussed herein by way of examples rather than limitations.

DETAILED DESCRIPTION

The example implementations disclosed in the present disclosure will be described in more detail below with reference to the accompanying drawings. Although the example implementations of the present disclosure are shown in the accompanying drawings, it should be understood that the present disclosure can be implemented in various forms and should not be limited by the specific implementations described here. On the contrary, these implementations are provided in order to have a more thorough understanding of the present disclosure and to fully convey the scope of the present disclosure to those skilled in the art.

In the following description, a large number of specific details are provided to provide a more thorough understanding of the present disclosure. However, it is evident to those skilled in the art that the present disclosure can be implemented without the need for one or more of these details. In other examples, in order to avoid confusion with the present disclosure, some well-known technical features in the art have not been described; that is, all the features of the actual implementations are not described here, and the well-known functions and structures are not described in detail.

In the attached drawings, for clarity, the dimensions of layers, regions, and components, as well as their relative dimensions, may be exaggerated. The same reference numerals indicate the same components throughout.

It should be understood that when a component or layer is referred to as "on", "adjacent to", "connected to" or "coupled to" other components or layers, it can be directly on, adjacent to, connected to, or coupled to other components or layers, or there can exist intermediate components or layers. On the contrary, when a component is referred to as "directly on", "directly adjacent to", "directly connected to", or "directly coupled to" other components or layers, there does not exist intermediate component or layer. It should be understood that although the terms first, second, third, etc. may be used to describe at least one of various components, members, regions, layers, or parts, the at least one of these components, members, regions, layers, or parts should not be limited by these terms. These terms are only used to distinguish one component, member, region, layer or part from another component, member, region, layer or part. Therefore, without departing from the present disclosure, the first component, member, region, layer or part discussed below can be represented as the second component, member, region, layer or part. When discussing the second component, member, region, layer or part, it does not necessarily indicate that there necessarily exists the first component, member, region, layer or part in the present disclosure.

Spatial relationship terms such as "underneath", "below", "lower", "under", "over", "upper", etc. can be used here for convenience in describing the relationship between a component or feature shown in the drawings and other components or features. It should be understood that in addition to the orientation shown in the drawing, it is intended that the spatial relationship term also includes different orientations of the devices in use and operation. For example, if a device in the accompanying drawings is turned over and then a component or feature described as "below" or "under" or "underneath" other components will be oriented "on" the other component or feature. Therefore, the example terms "below" and "underneath" may include both upper and lower orientations. The device can be oriented differently (rotated 90 degrees or other orientations) and the spatial description used here is explained accordingly.

The purpose of the terminology used here is only to describe specific implementations and is not to limit the present disclosure. When used here, the singular forms of "a", "an", and "the/said" are also intended to include the plural form, unless the context clearly indicates otherwise. It should also be understood that the terms "consisting of" and/or "including", when used in this description, it is to determine the presence of at least one of the features, integers, steps, operations, components, or members, but do not exclude the presence or addition of at least one of one or more other features, integers, steps, operations, components, members, or groups. When used here, the term "at least one of" includes any and all combinations of related listed items.

In order to gain a more detailed understanding of the characteristics and technical content of the implementations of the present disclosure, the implementing of the implementations of the present disclosure is described in detail below in conjunction with the accompanying drawings. The accompanying drawings are for reference only and are not intended to limit the implementations of the present disclosure.

It should be understood that the reference to "some implementations" or "one implementation" throughout the specification means that specific features, structures, or characteristics related to the implementations are included in at least one implementation of the present disclosure. Therefore, the words "in some implementations" or "in one implementation" appearing throughout the specification may not necessarily refer to the same implementation. In addition, these specific features, structures, or characteristics can be combined in one or more implementations in any suitable way. It should be understood that in the various implementations of the present disclosure, the size of the sequence numbers of the mentioned various processes does not imply the order of execution. The execution order of various processes should be determined based on its function and internal logic, and should not constitute any limitations on the implementation process of the implementations of the present disclosure. The above-mentioned sequence numbers of the implementations of the present disclosure are only for description, but do not represent the advantages or disadvantages of the implementations.

The methods disclosed in the several method implementations provided in the present disclosure can be arbitrarily combined to obtain new method implementations without conflict.

The memory device in the implementation of the present disclosure can be DRAM, or at least some devices in DRAM, suitable for a dual data rate synchronous dynamic random access memory using DDR4-memory specification and DDR5-memory specification, and a low-power dual data rate synchronous dynamic random access memory using LPDDR5-memory specification. It should be noted that the implementations of the present disclosure are not limited to DRAM, but in subsequent introductions, for clarity, only DRAM is used as an example for explanation. The decoder circuit can be a part of the peripheral circuit in a memory device.

FIG. 1 is a circuit schematic diagram of a memory cell array, according to some implementations of the present disclosure. As shown in FIG. 1, in DRAM, the memory cell array can be arranged in rows and columns, allowing the memory cell to be addressed by specifying the rows and columns of its array. The memory cell array includes word lines, such as WLn, WLn+1, WLn−1, and WLn−2 shown in FIG. 1; the memory cell array also includes bit lines, such as BLn, BLn+1, BLn−1, and BLn−2 shown in FIG. 1. The word lines and bit lines intersect, and the memory cell at the intersection of the selected word line and bit line is selected to perform read, write, or refresh operations. The memory cell shown in FIG. 1 can include a capacitor and a transistor, and a memory cell can include a transistor and a capacitor. A gate of the transistor is coupled to the word line, a controlled terminal (a source) of the transistor is coupled to an electrode (a first electrode) of the capacitor, the other controlled terminal (a drain) of the transistor is coupled to the bit line, and the other electrode (a second electrode) of the capacitor can be grounded or subjected to other voltages (such as vdd/2). As shown in FIG. 1, the memory cell array is arranged in an array of x rows and y columns, with rows and columns being either vertical or non-vertical. The x direction can be the second direction mentioned in the implementation of the present disclosure, and the y direction can be the first direction mentioned in the implementation of the present disclosure. The extension direction of the word line can be parallel to the x direction or have an angle with the x direction, and the extension direction of the bit line can be parallel to the y direction or have an angle with the y direction. The orthographic projection of the word line on the xoy plane is perpendicular to the orthographic projection of the bit line on the xoy plane, or there is a certain angle therebetween, but not perpendicular, and the implementation of the present disclosure is not limited thereto. When performing read or write operations, the corresponding word line can be selected using the word line selection signal, and the corresponding bit line can be selected based on the column selection signal. The word line and bit line can be selected simultaneously to locate the selected memory cell for read and write operations thereof. In some implementations, the capacitor in FIG. 1 can be replaced with other memory structures, including but not limited to, e.g., phase change memory structures, resistive variable memory structures, or magnetic variable memory structures.

In some implementations, capacitors represent logical 1 and 0 by the amount of charge stored within them, or a high voltage difference and a low voltage difference between the two ends of the capacitor. The voltage signal on the word line is applied to the gate to control the transistor to be on or off, achieving the selection and non-selection of the capacitor, and then reading the data information stored in the capacitor through the bit line, or writing the data into the capacitor for storage through the bit line. When reading the memory cell, the voltage fluctuation on bit line caused by capacitor charging and discharging is relatively weak, and the voltage fluctuation time caused by capacitor charging and discharging is also very short. Therefore, a sensing amplification circuit (SA) is provided in the peripheral circuit to couple with the bit line, and the sensing amplification circuit is configured to capture the weak voltage fluctuation on the bit line, and the capacitor voltage of the memory cell is restored locally based on the condition of the voltage fluctuation. The sensing amplification circuit may include a latch that can lock the restored capacitor voltage value, allowing the information stored in the memory cell to be transferred from the capacitor to the amplification circuit. The peripheral circuit can also include control logic, word line drivers, voltage generators, and other devices. The sensing amplification circuit can include a differential sensing amplification circuit 206, which is coupled to two bit lines and operates using a selected bit line and a complementary bit line used as a reference line to detect and amplify the voltage difference on a pair of bit lines.

Figure 2:
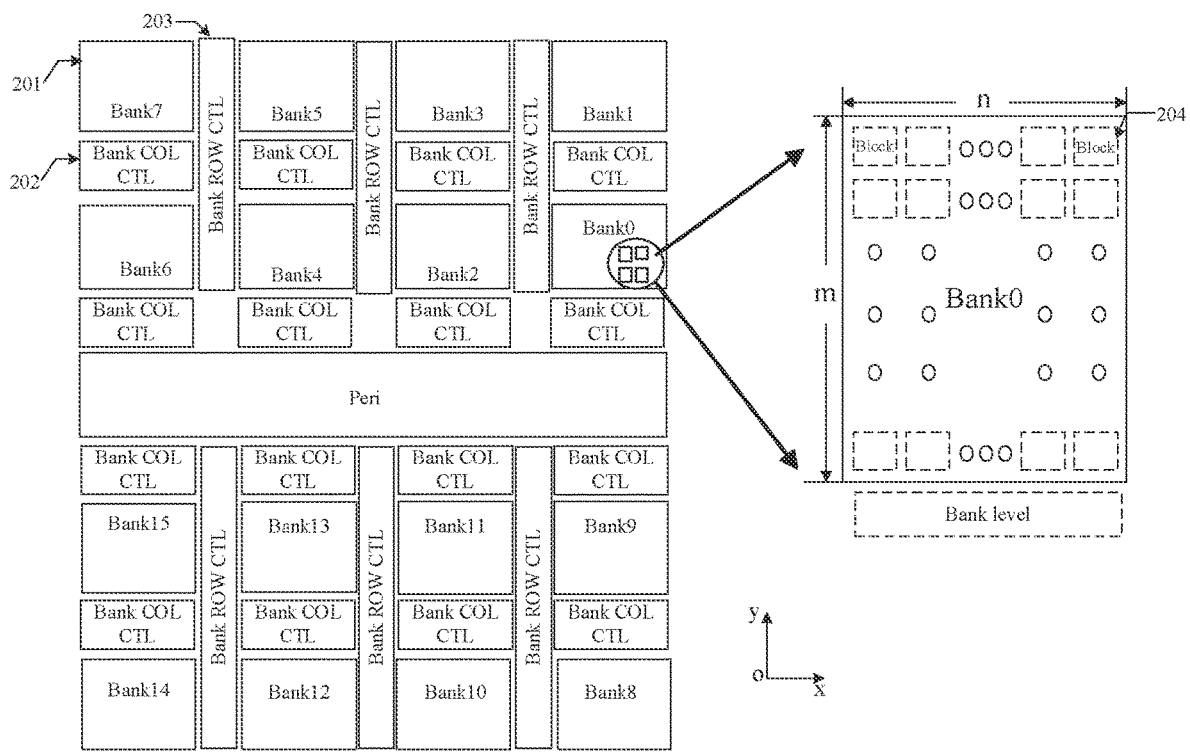
FIG. 2 is a layout diagram of a memory cell array, according to some implementations of the present disclosure.

In some implementations, as shown in FIG. 2, the memory cell array can be divided into a memory bank 201 and a memory block 204 based on the layout design of the memory device. The memory block 204 includes memory cells arranged in the x and y directions similar to those shown in FIG. 1, and the memory bank 201 includes memory block 204 arrays arranged in the x and y directions as shown in FIG. 2, a semiconductor device (or die) may include memory banks 201 arranged in the x and y directions as shown in FIG. 2. A memory device may include at least one die, a memory system may include a memory controller, and at least one memory device coupled to the memory controller, and the memory controller is configured to control the memory device for operations such as reading and writing.

Continuing as shown in FIG. 2, the peripheral circuit may include, e.g., a control circuit that controls multiple levels of memory cell arrays, a control circuit corresponding to a memory bank level, and a control circuit corresponding to the memory block level. Each control circuit of the memory block level is collectively connected to the control circuit of the memory bank level through interconnection lines (local interconnection lines), and each control circuit of the memory bank level is collectively connected to other shared regions of the peripheral circuit through interconnection lines (a first level bus), such as logic control. This logic control is configured to receive instructions from a host or a memory controller, and perform read, write, or refresh operations on the memory cell array.

In some implementations, the peripheral circuit may include a memory bank control circuit, which includes a memory bank row control circuit (Bank ROW CTL) 203 between two adjacent memory banks in the x direction (row direction), and the memory bank row control circuit may include a memory bank row decoder which may be configured to address the row where the memory bank 201 is located and apply an operating voltage to the word line. The memory bank control circuit also includes a memory bank column control circuit (Bank COL CTL) 202 between two adjacent memory banks 201 in the y direction (column direction), such as a memory bank column decoder which can be configured to address the column where the memory bank 201 is located, be configured to be coupled to a bit line and to apply a bit line voltage or receive a bit line voltage. In other implementations, as shown in FIG. 2, the peripheral circuit also includes a control logic located in the gap area (Peri) between the memory banks 201, for data exchange between the memory banks 201 and also for data exchange with the host.

In some implementations, in the x direction, a word line driver is provided between two adjacent memory blocks 204 to apply voltage to a selected word line; in the y direction (column direction), a sensing amplification circuit is provided between two adjacent memory blocks 204, such as a sensing amplification circuit 206 shown in FIG. 5 below. The peripheral circuit includes sensing amplification circuits 206, each of which is coupled to two adjacent bit lines in the y direction. The sensing amplification circuits 206 can be coupled and interconnected through a connecting circuit, and sensing amplification circuits 206 can be interconnected through a connecting circuit. The sensing amplification circuit 206 is coupled to two bit lines and operates using a selected bit line and a complementary bit line used as a reference line to detect and amplify the voltage difference on a pair of bit lines.

Figure 5:
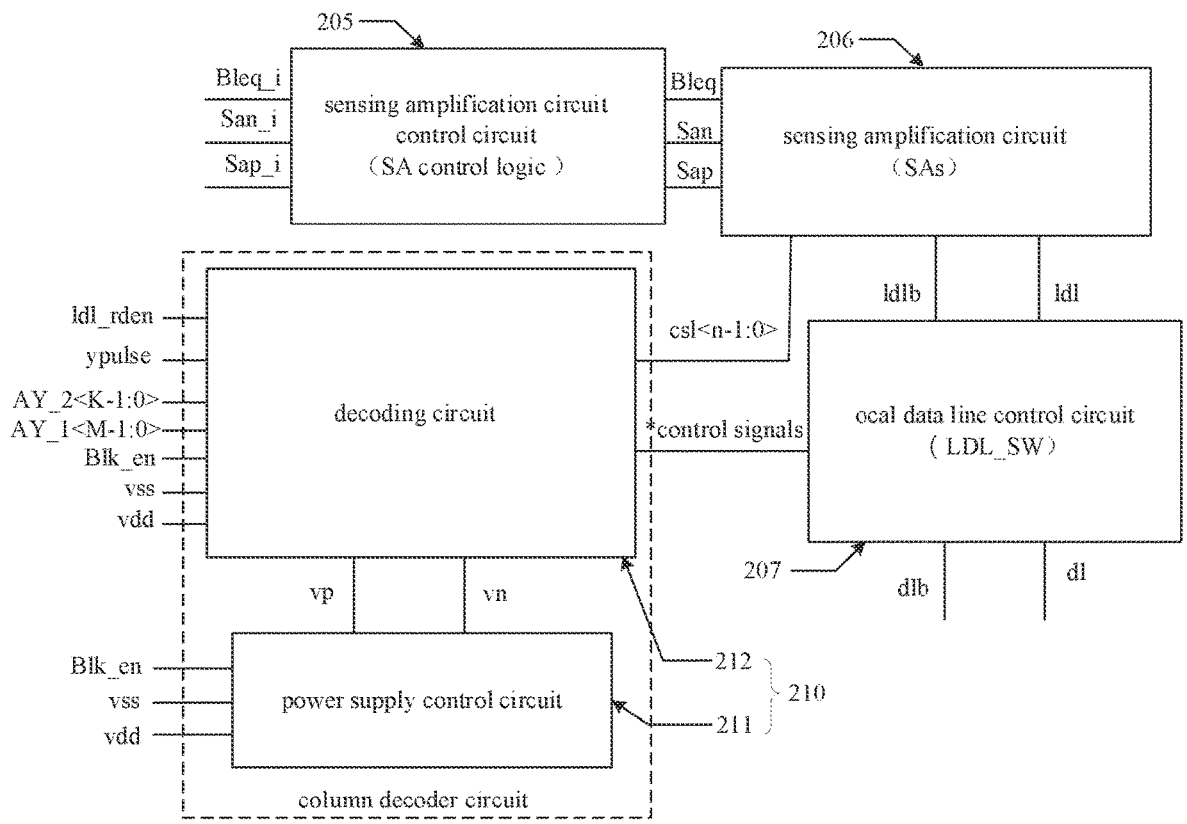
FIG. 5 is a schematic diagram of the connection relationship between some of the composition circuits of a peripheral circuit, according to some implementations of the present disclosure.

In some implementations, in some of the peripheral circuits in FIG. 5, the column decoder circuit 210 is coupled with the multiple columns of bit lines in the corresponding memory block 204, configured to receive a column address signal, perform decoding processing on the column address signal, and output a column selection signal which indicates the activation of the corresponding bit lines of the memory block 204 in the enabled state. The column decoder circuit 210 may include a decoding circuit 212 configured to generate at least a read control signal for controlling the bit line and a write control signal for controlling the bit line.

In some implementations, the column decoder circuit 210 is connected to an operation voltage vdd of a power supply device such as a voltage generator, as well as a common grounding voltage vss of the circuit, where vdd is a high logic level voltage and vss is a low logic level voltage. When one or more memory blocks 204 are selected, the state of the selected memory block 204 can be defined as an enabled state, and its corresponding column decoder circuit 210 can be defined as an enabled state. The column decoder circuit 210 corresponding to the selected memory block 204 is supplied with a high-level voltage and a low-level voltage, enabling the column decoder circuit 210 to complete its decoding and other operations, in order to perform read, write, or refresh operations on the selected memory block 204. When the memory block 204 is not selected, the state of the unselected memory block 204 can be defined as a non-enabled state, its corresponding column decoder circuit 210 can be defined as a non-enabled state, and the column decoder circuit 210 corresponding to the memory block 204 in a non-enabled state will also continue to be powered, so that when related operations corresponding to read, write, or refresh operations are not performed by each sub-circuit of the column decoder circuit 210, the signal output of each circuit of the column decoder circuit 210 is the same as when being selected. This may reduce the loss of data due to power failure of the capacitor storing data in memory block 204 and achieve a quick response of the column decoder circuit 210 when the memory block 204 transitions from a non-enabled state to an enabled state.

In the actual use of some column decoder circuits 210, continuous power supply is applied to a column selection circuit in the non-enabled state. Some input and output signals of the column selection circuit in the non-enabled state may leak, causing interference to the column decoder circuit 210 in an enabled state, affecting circuit stability, and increasing power consumption. The output signals of the column decoder circuit 210 include, but are not limited to, the control signals (or feedback signals) on the bit line and the sensing amplification circuit 206, and the control signals (or feedback signals) on the local data line control circuit 207 coupled to the sensing amplification circuit 206. The input signals of the column decoder circuit 210 include, but are not limited to, the enabling signal of the memory block 204, the high and low level signals (voltage) provided by the voltage generator to supply the input terminals of the column decoder circuit 210 transistor and other devices.

In view of this, an implementation of the present disclosure provides a decoder circuit that can be configured as at least a portion of the column decoder circuit 210. A power supply control circuit 211 is provided in the decoder circuit. When the semiconductor component is in a non-enabled state, some of the input terminals of the power supply control circuit 211 providing the voltage inputs are floated without providing power supply, and simultaneously, the output signal of the column selection circuit in the non-enabled state is the same as the output signal of the column selection circuit in the enabled state. This may reduce interference and lower power consumption while reducing data loss and maintaining the high-speed response of the column decoder circuit 210.

Figure 3A:
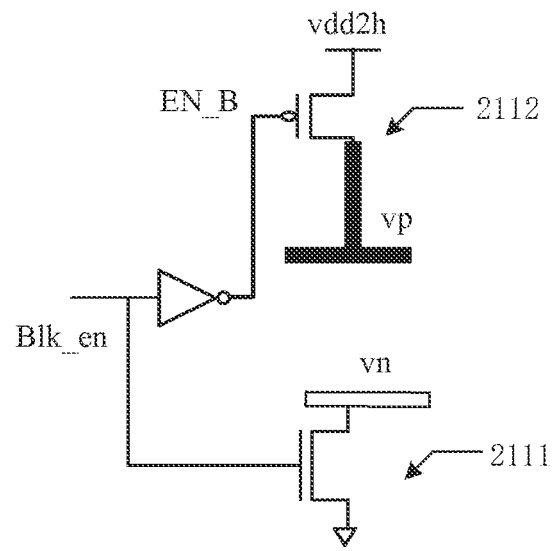
FIGS. 3a and 3b are schematic diagrams of the power supply control circuits, according to some implementations of the present disclosure.

According to some aspects of the implementations of the present disclosure, a decoder circuit is provided, which includes a power supply control circuit 211 including a first transistor 2111, a second transistor 2112, and a reverse circuit as shown in FIG. 3a. In some implementations, an input terminal of the first transistor 2111 is connected to a low-level voltage node, and an output terminal of the first transistor 2111 outputs a first ground voltage. In some implementations, an input terminal of the second transistor 2112 is connected to a high-level voltage node, and an output terminal of the second transistor 2112 outputs a first voltage. In some implementations, an input terminal of the reverse circuit receives a semiconductor component enabling signal. In some implementations, an output terminal of the reverse circuit is connected to an control terminal of one of the first transistor 2111 or the second transistor 2112. In some implementations, a control terminal of a transistor that is not connected to the reverse circuit receives the semiconductor component enabling signal. In some implementations, the decoding circuit 212 includes sub-circuits. In some implementations, the power supply interface of the sub-circuit is connected to the output terminal of the second transistor 2112, or the grounding interface of the sub-circuit is connected to the output terminal of the first transistor 2111.

In some implementations, the first transistor 2111 is an N-type transistor, and the second transistor 2112 is a P-type transistor. Each transistor includes an output terminal, an input terminal, and a control terminal. The output terminal and input terminal can be the source or drain of the transistor, or the two active regions of the transistor. The source and drain can be interchanged, and the implementations of the present disclosure do not limit the positions of the source and drain. The control terminal is the gate of the transistor. By applying different operating voltages to the gate, the conduction of the transistor channel is achieved, so that the voltage at the input terminal of the transistor is transmitted to the output terminal. The voltage of the output terminal can have a certain voltage drop compared to the input terminal, which is within the design voltage drop of the device or integrated circuit.

The first transistor 2111 can be an N-type transistor. Applying a high-level voltage to its control terminal turns on the first transistor 2111 and the voltage at the input terminal is transmitted to the output terminal. Applying a low-level voltage to its control terminal turns off the first transistor 2111 and the output terminal is in a floated state. The input terminal of the first transistor 2111 can input a low-level voltage, which can be a grounding voltage vss, and the output terminal outputs a low-level voltage to a grounding interface of the decoding circuit 212. For example, when the first transistor 2111 is turned on, the output terminal can output a first ground voltage vn, which is connected to a low-level voltage node to output a low-level voltage and provide a low-level voltage for the grounding interface in the decoding circuit 212. When the first transistor 2111 is not turned on, the output terminal is floated, the output voltage is in an uncertain state or without voltage output, and the grounding interface in the decoding circuit 212 is also floated.

The second transistor 2112 can be a P-type transistor. Applying a low-level voltage to its control terminal turns on the second transistor 2112 and the voltage at the input terminal is transmitted to the output terminal. Applying a high-level voltage to its control terminal turns off the second transistor 2112 and the output terminal is in a floated state. The input terminal of the second transistor 2112 can input a high-level voltage, which can be vdd2h, and the output terminal outputs the first voltage. For example, when the second transistor 2112 is turned on, the output terminal outputs a first voltage connected to a high-level voltage node, outputting a high-level voltage vp to provide a high-level voltage for the power supply interface in the decoding circuit 212. When the second transistor 2112 is not turned on, the output terminal is floated, the output voltage is in an uncertain state or without voltage output, and the grounding interface in the decoding circuit 212 is also floated. Compared to the voltage of vdd2h, the first voltage vp can have a certain voltage drop. Compared to the first ground voltage vn, the logical level of the first voltage vp belongs to a high-level voltage.

In the power supply network of the circuit, a node providing a low-level voltage or an interconnection line providing a low-level voltage is coupled with the input terminal of the first transistor 2111 to input a low-level voltage to the input terminal of the first transistor 2111. In the power supply network of the circuit, a node providing a high-level voltage or an interconnection line providing a high-level voltage is coupled with the input terminal of the second transistor 2112 to input a high-level voltage to the input terminal of the second transistor 2112. The low-level voltage and the high-level voltage can be provided by a device such as a voltage generator.

The semiconductor component may include a memory cell array as shown in FIG. 1, or include a memory bank 201 or a memory block 204 in the memory cell array. The semiconductor component enabling signal can be generated by a device that directly or indirectly controls the semiconductor component, and the enabling signal indicates that the semiconductor component is in an enabled state. For example, the semiconductor component can include a memory block 204, and the enabling signal of memory block 204 can be generated by a peripheral circuit, a memory controller, or a host that controls the operation of memory block 204. The enabling signal indicates that memory block 204 is in an enabled state, and the enabling signal can be a high-level voltage or a low-level voltage. The reverse circuit can include an inverter, and when a high-level voltage is input to the input terminal of the reverse circuit, its output terminal outputs a low-level voltage; when a low-level voltage is input to the input terminal of the reverse circuit, its output terminal outputs a high-level voltage. One of the control terminals of the first transistor 2111 and the control terminal of the second transistor 2112 is connected to the reverse circuit, while the other control terminal is not connected to the reverse circuit and directly receives the enabling signal.

In some implementations, as shown in FIG. 3a, the control terminal of the second transistor 2112 is connected to the output terminal of the reverse circuit, and the control terminal of the first transistor 2111 receives the semiconductor component enabling signal; the semiconductor component enabling signals indicates that the semiconductor component is at a high-level voltage when the semiconductor component is in an enabled state.

The input terminal of the reverse circuit receives a high level enabling signal Blk_en, outputs a low-level voltage to the control terminal of the second transistor 2112 to make the second transistor 2112 be turned on, and the output terminal of the second transistor 2112 outputs a high level first voltage vp to the power supply interface of the decoding circuit 212. The control terminal of the first transistor 2111 is not coupled to the reverse circuit, and the control terminal of the first transistor 2111 receives a high level enabling signal Blk_en, the first transistor 2111 is turned on, and its output terminal outputs the first ground voltage vn to the grounding interface of the decoding circuit 212. In FIG. 3a, if the high level enabling signal Blk_en is not applied, or a low level signal is applied (that is, the semiconductor component is in a non-enabled state), the first transistor 2111 and the second transistor 2112 are not turned on, the output terminals of both transistors are floated, without a voltage being output. The grounding interface and the power supply interface of the decoding circuit 212 are both floated, without a voltage being input.

Figure 3B:
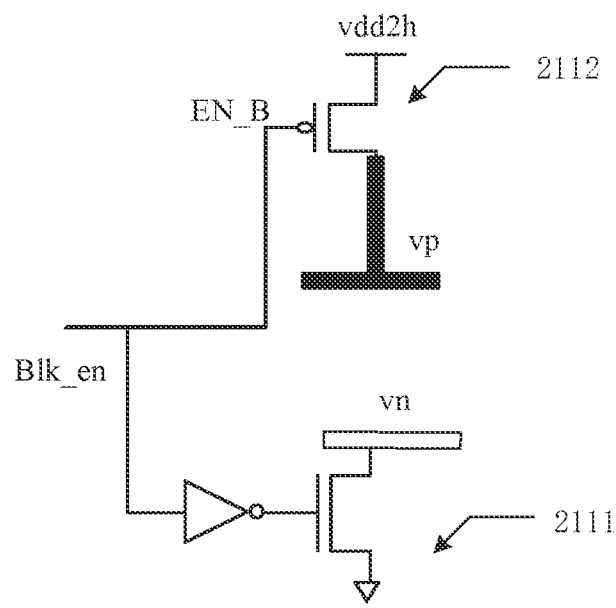

In some implementations, as shown in FIG. 3b, the control terminal of the first transistor 2111 is connected to the output terminal of the reverse circuit, and the control terminal of the second transistor 2112 receives the semiconductor component enabling signal; the semiconductor component enabling signal indicates that the semiconductor component is at a low-level voltage when the semiconductor component is in an enabled state.

The reverse circuit receives a low level enabling signal Blk_en from its input terminal, and outputs a high-level voltage to the control terminal of the first transistor 2111 to turn on the first transistor 2111, and the output terminal of the first transistor 2111 outputs a low level first ground voltage vn to the grounding interface of the decoding circuit 212. The control terminal of the second transistor 2112 is not coupled to the reverse circuit, and the control terminal of the second transistor 2112 receives a low level enabling signal Blk_en to turn on the second transistor 2112, and its output terminal outputs a high level first voltage vp to the power supply interface of the decoding circuit 212. In FIG. 3b, if a low level enabling signal Blk_en is not applied, or a high level signal is applied (that is, the semiconductor component is in a non-enabled state), the first transistor 2111 and the second transistor 2112 are not turned on, and the output terminals of both transistors are floated without a voltage output. The grounding interface and power supply interface of the decoding circuit 212 are floated without a voltage input.

In the implementation of the present disclosure, when the semiconductor component is in an enabled state, the semiconductor component enabling signal turns on both the first transistor 2111 and the second transistor 2112. The output terminal of the first transistor 2111 outputs the first ground voltage to the grounding interface of the decoding circuit 212, and the output terminal of the second transistor 2112 outputs the first voltage to the power supply interface of the decoding circuit 212, achieving normal power supply for the devices of the decoding circuit 212. When the semiconductor component is in a non-enabled state, both the first transistor 2111 and the second transistor 2112 are turned off, the output terminals of the first transistor 2111 and the second transistor 2112 are floated without a voltage output, one of the power supply interface and the grounding interface of each sub-circuit of the sub-circuits of the decoding circuit is connected to the corresponding output terminal of the first transistor 2111 and the second transistor 2112 and is floated, the remaining interfaces of each sub-circuit of the sub-circuits are powered normally. Thus, for a semiconductor component in a non-enabled state, its output is a fixed level voltage corresponding to the normal power supply of the remaining interfaces, there is no current formed between the power supply interface and the grounding interface. Thus, while ensuring that the semiconductor component in various states can work normally, the leakage of electricity and the power consumption of the power supply interface and the grounding interface of the semiconductor component in a non-enabled state are reduced.

In some implementations, the sub-circuits include at least one of a first sub-circuit or a second sub-circuit. The output interface of the first sub-circuit outputs a low-level voltage, the power supply interface of the sub-circuit is connected to the output terminal of the second transistor 2112, and the grounding interface is connected to the low-level voltage node. The output interface of the second sub-circuit outputs a high-level voltage, the grounding interface of the sub-circuit is connected to the output terminal of the first transistor 2111, and the power supply interface is connected to the high-level voltage node.

FIGS. 4*a* to 4*e* show schematic diagrams of some sub-circuits of the decoding circuit 212. It should be pointed out that the sub-circuits shown in the figures can be some examples of the decoding circuit 212, and any circuit in the figure can be arbitrarily selected to couple to form a decoding circuit 212 with different device functions. The interfaces or terminals shown in the figure that can input or output the same voltage can be coupled to each other to form different decoding circuits 212.

Figure 4A:
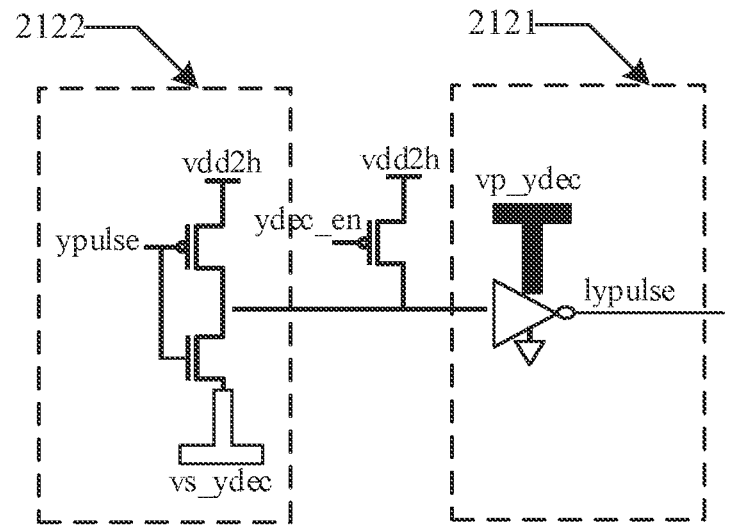
FIGS. 4a to 4f are schematic diagrams of some sub-circuits of the decoding circuit, according to some implementations of the present disclosure.

As shown in FIG. 4*a*, a sub-circuit of decoding circuit 212 includes a coupled first sub-circuit 2121 and a second sub-circuit 2122. The second sub-circuit 2122 can include a reverse circuit composed of two transistors. The input interface (or input terminal) of the second sub-circuit 2122 receives a pulse voltage signal ypulse, its power supply interface is connected to a high-level voltage node, its grounding interface can be connected to the output terminal of the first transistor 2111, and the second sub-circuit 2122 outputs a high-level voltage to the input terminal of the first sub-circuit 2121. The first sub-circuit 2121 can include a reverse circuit. The power supply interface of the first sub-circuit 2121 is connected to the output terminal of the second transistor 2112, the grounding interface is connected to a low-level voltage node, such as a grounding node, and the first sub-circuit 2121 outputs a first timing control signal lypulse of low-level voltage. When the semiconductor component is in an enabled state, both the first transistor 2111 and the second transistor 2112 are turned on, and all interfaces of the second sub-circuit 2122 and the first sub-circuit 2121 are powered normally. When the semiconductor component is in a non-enabled state, both the first transistor 2111 and the second transistor 2112 are turned off, the grounding interface of the second sub-circuit 2122 and the power supply interface of the first sub-circuit 2121 are floated without voltage supply, and the power supply interface of the second sub-circuit 2122 and the grounding interface of the first sub-circuit 2121 are powered normally.

It can be understood that in the second sub-circuit 2122, when the pulse voltage signal ypulse is a low-level voltage, the P-type transistor will be turned on, while the N-type transistor will not be turned on. The power supply input terminal of the P-type transistor is connected to a high-level voltage node vdd2h, the output terminal of the N-type transistor is floated or powered normally, and the output interface of the second sub-circuit 2122 will all output a high-level voltage. That is to say, in this case, whether the first transistor 2111 is on or off, the output voltage of the output interface of the second sub-circuit 2122 can remain unchanged, or the logic level remains unchanged. The input interface of the first sub-circuit 2121 is coupled to the output interface of the second sub-circuit 2122. As long as the grounding interface is powered normally, and the power supply interface of the first sub-circuit 2121 is floated or powered normally, the output interface of the first sub-circuit 2121 will all output a first timing control signal lypulse of low-level voltage. Whether the second transistor 2112 is on or off, the output voltage of the output interface of the first sub-circuit 2121 can remain unchanged, or the logic level remains unchanged.

It should be pointed out that the second sub-circuit 2122 and the first sub-circuit 2121 can include a circuit with input terminals (at least including a power supply interface and a grounding interface) and an output interface, with the input terminals of the circuit inputting at least one high-level voltage and one low-level voltage to various gate circuits, for example. The various gate circuits may include, but are not limited to, one or more of an AND gate, an OR gate, a NOT gate (inverter), a NAND gate, or a NOR gate.

Figure 4B:
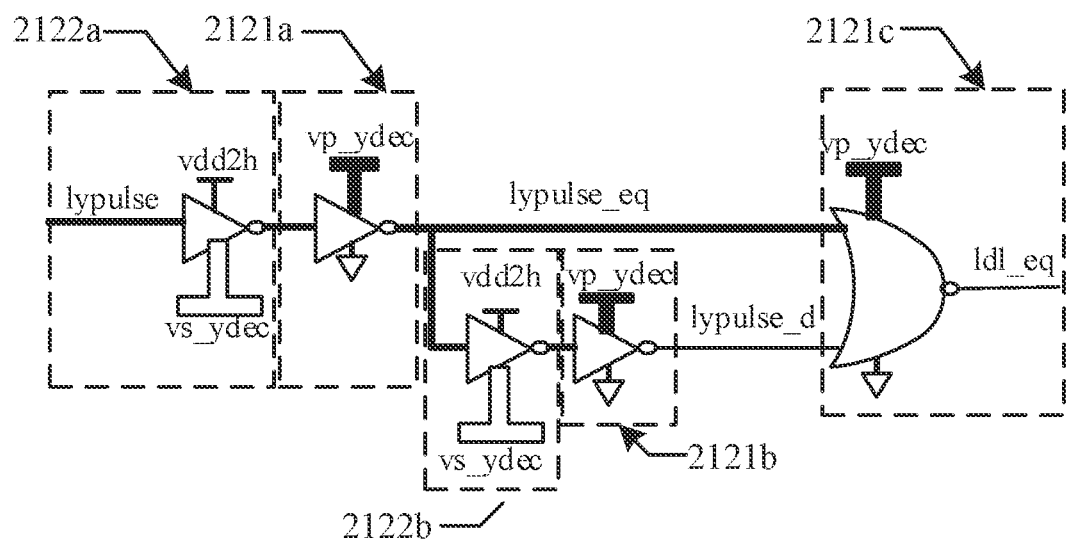

In some implementations, as shown in FIG. 4*b*, a circuit example is shown where a sub-circuit of decoding circuit 212 is composed of second sub-circuits 2122 and first sub-circuits 2121. The second sub-circuit 2122 may include a NOT gate (inverter), and the first sub-circuit 2121 may include a NOT gate or a NOR gate. In FIG. 4*b*, the signal flow is from left to right. The input port of the first second sub-circuit 2122*a* receives a first timing control signal lypulse of low-level voltage, the power supply interface is connected to the high-level voltage node, the grounding interface is connected to the output terminal of the first transistor 2111, and the output terminal of the first transistor 2111 normally outputs a low-level voltage or is floated; the output interface of the first second sub-circuit 2122*a* all outputs a high-level voltage to the first first sub-circuit 2121*a*, the power supply interface of the first sub-circuit 2121*a* is connected to the output terminal of the second transistor 2112, and the output terminal of the second transistor 2112 normally outputs a high-level voltage or is floated; the output interface of the first first sub-circuit 2121*a* all outputs a second timing control signal lypulse_eq of low-level voltage. The second timing control signal lypulse_eq of low-level voltage passes through two NOT gates (the second second sub-circuit 2122*b* and the second first sub-circuit 2121*b*) in turn, and then a third timing control signal lypulse_d of low-level voltage is output. The third timing control signal lypulse_d of low-level voltage and the second timing control signal lypulse_eq of low-level voltage are input to an NOR gate (the third first sub-circuit 2121*c*), the grounding interface of the NOR gate is connected to the grounding node, the power supply interface of the NOR gate is connected to the output terminal of the second transistor 2112, the output terminal of the second transistor 2112 normally outputs a high-level voltage or is floated, and the output port of the NOR gate all outputs a first local control signal ldl_eq of low-level voltage. The first timing control signal lypulse of low-level voltage can be generated and input by the circuit in FIG. 4*a*, thereby coupling the circuits shown in FIGS. 4*a* and 4*b*.

Figure 4C:
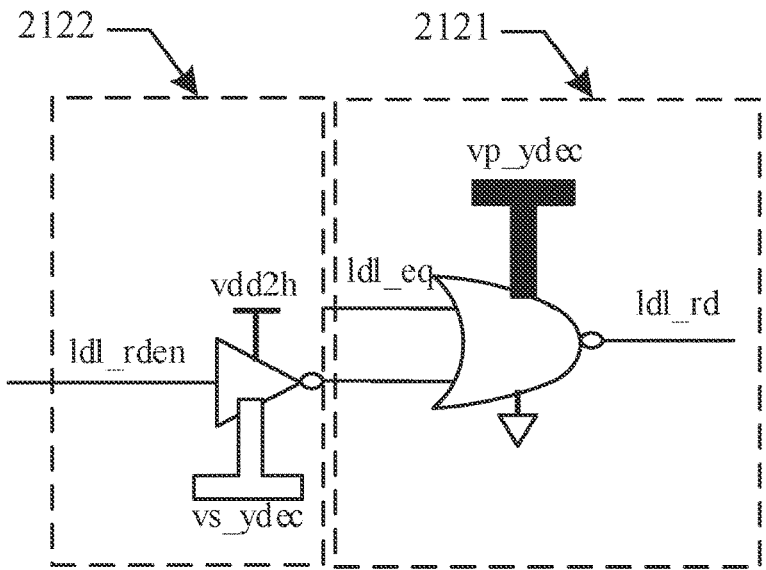

In some implementations, as shown in FIG. 4*c*, the second sub-circuit 2122 may include a NOT gate (inverter), the first sub-circuit 2121 may include an NOR gate, and the output interface of the second sub-circuit 2122 is connected to an input interface of the first sub-circuit 2121. A second local control signal ldl_rden of low-level voltage is input to the second sub-circuit 2122, its power supply interface is connected to a high-level voltage node, and its grounding interface is connected to the output terminal of the first transistor 2111; when the output terminal of the first transistor 2111 outputs a low-level voltage or is floated, the output interface of the second sub-circuit 2122 all outputs a high-level voltage to the first input interface of the first sub-circuit 2121; the second input port of the first sub-circuit 2121 receives and inputs a first local control signal ldl_eq of low-level voltage, the grounding interface of the first sub-circuit 2121 is connected to the grounding node, and the power supply interface of the first sub-circuit 2121 is connected to the output terminal of the second transistor 2112; the output terminal of the second transistor 2112 normally outputs a high-level voltage or is floated, and its output interface all outputs a third local control signal ldl_rd of low-level voltage. The first local control signal ldl_eq of low-level voltage can be generated and input by the circuit in FIG. 4b, thereby coupling the circuits shown in FIG. 4b and FIG. 4c.

Figure 4D:
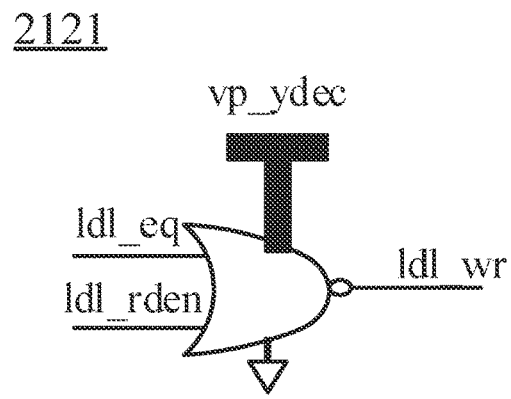

In some implementations, as shown in FIG. 4d, the sub-circuit of decoding circuit 212 may include a first sub-circuit 2121, which may include an NOR gate. The input terminal of the first sub-circuit 2121 receives a first local control signal ldl_eq of low-level voltage and a second local control signal ldl_rden of low-level voltage. The grounding interface of the first sub-circuit 2121 is connected to the grounding node, the power supply interface is connected to the output terminal of the second transistor 2112, the output terminal of the second transistor 2112 normally outputs high-level voltage or is floated, and its output terminal all outputs a fourth local control signal ldl_wr of low-level voltage. The low-level voltage ldl_eq can be generated and input by the circuit in FIG. 4b, thereby coupling the circuits shown in FIG. 4b and FIG. 4d.

Figure 4E:
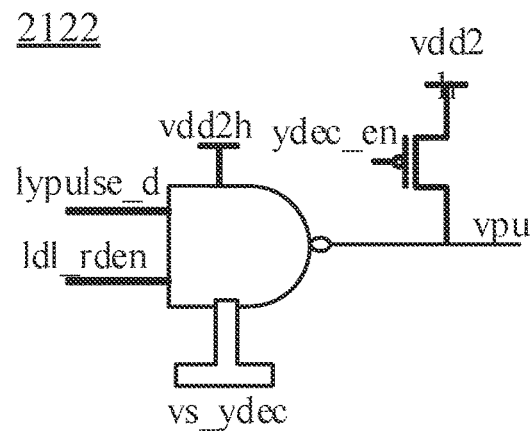

In some implementations, as shown in FIG. 4e, the sub-circuit of decoding circuit 212 may include a second sub-circuit 2122, which may include a NAND gate. The input terminal of the second sub-circuit 2122 receives a third timing control signal lypulse_d of low-level voltage and a second local control signal ldl_rden of low-level voltage, its power supply interface is connected to a high-level voltage node, its grounding interface is connected to the output terminal of the first transistor 2111, the output terminal of the first transistor 2111 normally outputs a low-level voltage or is floated, and the output interface of the second sub-circuit 2122 all outputs a high-level voltage.

Figure 4F:
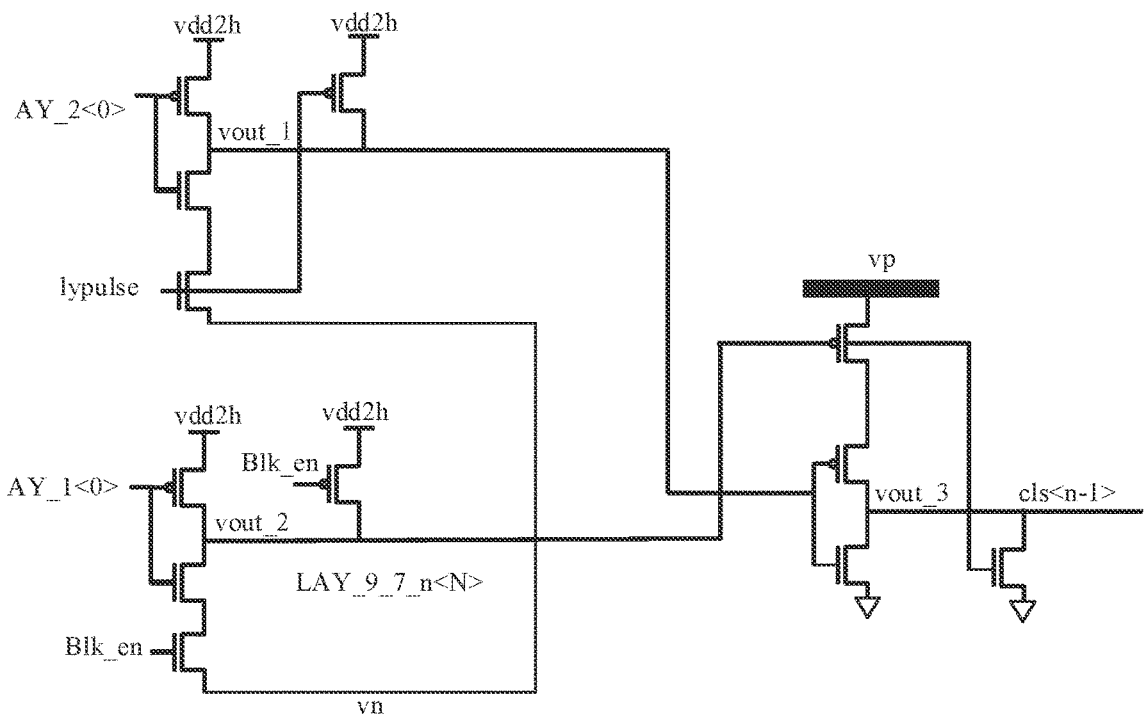

In some implementations, as shown in FIG. 4f, the decoding circuit 212 may include a more complex circuit composition, with the first and second sub-circuits 2121 and 2122 having more input terminals and more complex coupling ways. The power supply interface is connected to a high-level voltage node, the grounding interface is connected to the output terminal of the first transistor 2111, and the output terminal of the second sub-circuit 2122 outputs a high-level voltage signal vout_1 and vout_2. The grounding interface of the first sub-circuit 2121 is connected to the grounding node, its power supply interface is connected to the output terminal of the second transistor 2112, and the output terminal of the first sub-circuit 2121 outputs a low-level voltage signal vout_3.

For the power supply control circuit 211 of the implementation of the present disclosure, when the semiconductor component is in an enabled state, both the first transistor 2111 and the second transistor 2112 are turned on, providing normal power supply for the decoder circuit; when the semiconductor component is in a non-enabled state, both the first transistor 2111 and the second transistor 2112 are turned off, and the interface connected to the output terminals of the first transistor 2111 and the second transistor 2112 in the decoding circuit 212 is floated without a voltage input, reducing circuit interference and lowering power consumption. The output interface of the sub-circuit of the decoding circuit 212 outputs a corresponding fixed level voltage when the semiconductor component is in an enabled or non-enabled state to reduce data loss caused by power failure and maintain a high-speed response of the decoder circuit. The decoder circuit of the implementation of the present disclosure can be applied to a column decoder circuit 210 of a memory device which may include a dynamic random access memory.

According to some aspects of the implementation of the present disclosure, a memory device is provided. The memory device may include a memory cell array and a peripheral circuit coupled to the memory cell array. The memory cell array includes at least one memory block 204, which is provided with word lines and bit lines, and memory cells coupled between the word lines and bit lines. The peripheral circuit includes a column decoder circuit 210 corresponding to the memory block 204, the column decoder circuit 210 is coupled with bit lines in the corresponding memory block 204 and configured to receive a column address signal, decode the column address signal, and output a column selection signal. The column selection signal indicates to activate the corresponding bit lines of the memory block 204 in the enabled state. During the decoding process, for a memory block 204 in an enabled state, the power supply interface and the grounding interface of each sub-circuit in the column decoder circuit 210 are each powered normally. For a memory block 204 in a non-enabled state, one of the power supply interface or the grounding interface of each sub-circuit in column decoder circuit 210 is floated according to a predetermined regularity.

The memory cell array can include the memory cell array shown in FIG. 1. The memory device in the implementation of the present disclosure can be DRAM, or at least a part of the devices of the DRAM, suitable for a dual data rate synchronous dynamic random access memory using DDR4-memory specification and DDR5-memory specification, and a low-power dual data rate synchronous dynamic random access memory using LPDDR5-memory specification. A memory block 204 in the memory cell array can serve as a semiconductor component in the aforementioned implementation.

As shown in FIG. 2, a memory block 204 can correspond to a column decoder circuit 210 which is coupled to all bit lines in the memory block 204 and located between two adjacent memory blocks 204 in the y direction. A memory block 204 can correspond to a word line driver (or row decoder circuit), and the word line decoder can be located between two adjacent memory blocks 204 in the x direction and coupled to the word lines of the corresponding memory block 204. FIG. 5 provides a schematic diagram of a part of the peripheral circuit. As shown in FIG. 5, the peripheral circuit of the memory device may include a column decoder circuit 210, the column decoder circuit 210 may include a decoding circuit 212 and a power supply control circuit 211 coupled to the decoding circuit 212.

For example, when a memory device receives an access request from a host or a memory controller, an address signal is received, and read, write, or refresh operations on a memory cell corresponding to the address signal are performed. The address signal may include an address signal which may include a row address signal and a column address signal. The peripheral circuit performs address decoding or addressing operations, a row address signal is input into a row address buffer and is decoded through a word line driver, and a row selection signal is output. The row selection signal indicates to activate the word line where the memory cell that needs to perform the operation is located. A column address signal is input into a column address buffer and is decoded through the column decoder circuit 210, and a column selection signal is output. The column selection signal indicates to activate the bit line where the memory cell that needs to perform the operation is located. The memory cell at the intersection of the activated bit line and the activated word line, in other words, the memory cell coupled to both the activated bit line and the activated word line, is the memory cell that needs to perform the operation. When the peripheral circuit performs address decoding or addressing operations, using column decoding as an example, the memory block 204 where the memory cell to be operated is located can be determined based on the address signal, and an enabling signal is generated to indicate that the memory block 204 is in an enabled state. The enabling signal is sent to the column decoder circuit 210 corresponding to the enabled memory block 204, and the decoder circuit that receives the enabling signal performs the decoding operation.

During the decoding process of the column decoder circuit 210, for the memory block 204 in an enabled state, the power supply interface and the grounding interface of each sub-circuit in the column decoder circuit 210 corresponding to the memory block in an enabled state are each powered normally. For the memory block 204 in a non-enabled state, one of the power supply interface or the grounding interface of each sub-circuit in the column decoder circuit 210 corresponding to the memory block in a non-enabled state is floated according to a predetermined regularity, thereby reducing leakage current and power consumption in the column decoder circuit 210. When one of the power supply interface or the grounding interface of each sub-circuit in the column decoder circuit 210 is floated according to a predetermined regularity, each interface of each sub-circuit in the column decoder circuit 210 powered normally outputs a corresponding fixed level voltage, to reduce data loss caused by power failure and maintain a high-speed response of the decoder circuit.

In some implementations, the column decoder circuit 210 includes, e.g., a power supply control circuit 211 including an input interface, a first output interface, and a second output interface. The input interface receives a memory block 204 enabling signal, the first output interface outputs a first voltage, and the second output interface outputs a first ground voltage. When the memory block 204 enabling signal indicates that memory block 204 is in an enabled state, the first output interface is connected to a high-level voltage node, and the second output interface is connected to a low-level voltage node. When the memory block 204 enabling signal indicates that the memory block 204 is in a non-enabled state, both the first voltage and the first ground voltage are floated. The memory device may include a decoding circuit 212 including sub-circuits. Each of the sub-circuits includes a power supply interface, a grounding interface, and an output interface. The power supply interface of the sub-circuit receives a first voltage or the grounding interface receives a first ground voltage. The output interface of the sub-circuit outputs a corresponding fixed level voltage when the memory block 204 enabling signal indicates that the memory block 204 is in a non-enabled state.

In some implementations, the power supply control circuit 211 includes, e.g., a first transistor 2111, a second transistor 2112, and a reverse circuit. The input terminal of the first transistor 2111 is connected to a low-level voltage node, and the output terminal of the first transistor 2111 outputs a first ground voltage. The input terminal of the second transistor 2112 is connected to a high-level voltage node, and the output terminal of the second transistor 2112 outputs a first voltage. The input terminal of the reverse circuit receives the memory block 204 enabling signal, and the output terminal of the reverse circuit is connected to the control terminal of the first transistor 2111 or the control terminal of the second transistor 2112. The control terminal of the transistor that is not connected to the reverse circuit receives the memory block 204 enabling signal.

In some implementations, the first transistor 2111 is an N-type transistor and the second transistor 2112 is a P-type transistor.

In some implementations, as shown in FIG. 3a, the control terminal of the second transistor 2112 is connected to the output terminal of the reverse circuit, and the control terminal of the first transistor 2111 receives the memory block 204 enabling signal. The memory block 204 enabling signal indicates that the memory block 204 is at a high-level voltage when the memory block 204 is in an enabled state.

The input terminal of the reverse circuit receives a high level enabling signal Blk_en, a low-level voltage is output to the control terminal of the second transistor 2112 to turn on the second transistor 2112, and the output terminal of the second transistor 2112 outputs a high level first voltage vp to transmit it to the power supply interface of the decoding circuit 212. The control terminal of the first transistor 2111 is not coupled to the reverse circuit, and the control terminal of the first transistor 2111 receives a high level enabling signal Blk_en, the first transistor 2111 is turned on; and its output terminal outputs the first ground voltage vn to transmit it to the grounding interface of the decoding circuit 212. A high level enabling signal Blk_en is not applied, or a low level signal is applied. That is, the memory block 204 is in a non-enabled state, the first transistor 2111 and the second transistor 2112 are not turned on, the output terminals of both transistors are floated without a voltage output, one of the power supply interface and the grounding interface of each sub-circuit of the sub-circuits in the decoding circuit 212 is connected to a corresponding output terminal of the first transistor and the second transistor and is floated, and the remaining interface of each sub-circuit of the sub-circuits is powered normally.

In some implementations, as shown in FIG. 3b, the control terminal of the first transistor 2111 is connected to the output terminal of the reverse circuit, and the control terminal of the second transistor 2112 receives the memory block 204 enabling signal; the memory block 204 enabling signal indicates that the memory block 204 is at a low-level voltage when the memory block 204 is in an enabled state.

The output terminal of the reverse circuit receives a low level enabling signal Blk_en, and a high-level voltage is output to the control terminal of the first transistor 2111 to turn on the first transistor 2111, and the output terminal of the first transistor 2111 outputs a low level first ground voltage vn to transmit it to the grounding interface of the decoding circuit 212. The control terminal of the second transistor 2112 is not coupled to the reverse circuit, and the control terminal of the second transistor 2112 receives a low level enabling signal Blk_en, the second transistor 2112 is turned on, and its output terminal outputs a high level first voltage vp to transmit it to the power supply interface of the decoding circuit 212. A low level enabling signal Blk_en is not applied, or a high level signal is applied. That is, the memory block 204 is in a non-enabled state, the first transistor 2111 and the second transistor 2112 are not turned on, the output terminals of both transistors are floated without a voltage output, one of the power supply interface and the grounding interface of each sub-circuit of the sub-circuits in the decoding circuit 212 is connected to the corresponding output terminal of the first transistor and the second transistor and is floated, and the remaining interface of each sub-circuit of the sub-circuits is powered normally.

In some implementations, as shown in FIGS. 4a to 4f, the sub-circuits of the decoding circuit 212 include at least one of a first sub-circuit 2121 or a second sub-circuit 2122. The output interface of the first sub-circuit 2121 outputs a low-level voltage, the power supply interface of the sub-circuit is connected to the output terminal of the second transistor 2112, and the grounding interface is connected to the low-level voltage node. The output interface of the second sub-circuit 2122 outputs a high-level voltage, the grounding interface of the sub-circuit is connected to the output terminal of the first transistor 2111, and the power supply interface is connected to the high-level voltage node.

It should be pointed out that the sub-circuits shown in FIGS. 4a to 4f can be some examples of the decoding circuit 212, and any circuit in the figure can be arbitrarily selected to couple to form a decoding circuit 212 with different device functions. The first sub-circuit 2121 and the second sub-circuit 2122 may include a circuit with input terminals (at least including a power supply interface and a grounding interface) and an output interface. At least one of the power supply interface or the grounding interface of the first sub-circuit 2121 and the second sub-circuit 2122 is connected to a corresponding output terminal of the first transistor and the second transistor and is floated, and the remaining interface of each sub-circuit in the sub-circuits is powered normally. The first sub-circuit 2121 and the second sub-circuit 2122 include but are not limited to, e.g., various gate circuits. The various gate circuits may include, but are not limited to, one or more of an AND gate, an OR gate, a NOT gate (inverter), a NAND gate, or a NOT gate.

Referring to FIG. 4b, a circuit example in which a sub-circuit of the decoding circuit 212 is composed of second sub-circuits 2122 and first sub-circuits 2121 is shown. The second sub-circuit 2122 may include a NOT gate (inverter), and the first sub-circuit 2121 may include a NOT gate or an NOR gate. In FIG. 4b, the signal flow is from left to right. A low-level voltage lypulse is input to the first second sub-circuit 2122a, a high-level voltage is input to the vdd2h power supply interface, the vs_ydec grounding interface is connected to the vn output terminal of the first transistor 2111 to be normal powered or floated, the output interface all outputs a high-level voltage to the first first sub-circuits 2121a, and the vp_ydec power supply interface of the first sub-circuit 2121a is connected to the vp output terminal of the second transistor 2112 to be normal powered or floated, and the output interface all outputs a low-level voltage lypulse_eq. The low-level voltage lypulse_eq passes through two NOT gates (the second second sub-circuit 2122b and the second first sub-circuit 2121b) in turn and outputs a low-level voltage lypulse_d. The low-level voltage lypulse_d and the low-level voltage lypulse_eq are input to a NOR gate (the third first sub-circuit 2121c), the grounding interface of the NOR gate is grounded, the vp_ydec power supply interface of the NOR gate is connected to the vp output terminal of the second transistor 2112 to be normal powered or floated, and the output interface all outputs a low-level voltage ldl_eq. The low-level voltage lypulse can be generated and input by the circuit in FIG. 4a, thereby coupling the circuits shown in FIGS. 4a and 4b. When the memory block 204 is in an enabled state, both the first transistor 2111 and the second transistor 2112 of the power supply control circuit 211 are turned on to power the vp_ydec power supply interface and the vs_ydec grounding interface in the sub-circuit. When the memory block 204 is in a non-enabled state, both the first transistor 2111 and the second transistor 2112 are turned off, the vp_ydec power supply interface and the vs_ydec grounding interface are both floated; the corresponding level voltages output from the output interface of each sub-circuit have the same logic level when the memory block 204 is in an enabled or non-enabled state. A low-level voltage ldl_eq can be generated and input by the circuit in FIG. 4b, thereby coupling the circuits shown in FIG. 4b and FIG. 4c.

For the power supply control circuit 211 of the implementation of the present disclosure, when the memory block 204 is in an enabled state, both the first transistor 2111 and the second transistor 2112 are turned on to normally power the decoding circuit 212; when the memory block 204 is in a non-enabled state, both the first transistor 2111 and the second transistor 2112 are turned off, and the output terminals of the first transistor 2111 and the second transistor 2112 are both floated without a voltage output, one of the power supply interface and the grounding interface of each sub-circuit of sub-circuits in the decoding circuit is connected to a corresponding output terminal of the first transistor 2111 and the second transistor 2112 and is floated, and the remaining interface of each sub-circuit of the sub-circuits is powered normally. Thus, for a semiconductor component in a non-enabled state, its output is a fixed level voltage corresponding the voltage when the remaining interface is powered normally, without a current being formed between the power supply interface and the grounding interface. Thus, while ensuring that the semiconductor component in various states can work normally, the leakage of electricity and power consumption of the power supply interface and the grounding interface of the semiconductor component in a non-enabled state is reduced.

In some implementations, the decoding circuit 212 includes a control signal generation circuit and an address enabling generation circuit. The control signal generation circuit is coupled to the power supply control circuit 211, and is configured to generate at least a local data line read control signal and a local data line write control signal. The address enabling generation circuit is coupled to the power supply control circuit 211 and is configured to receive a column address signal and a memory block enabling signal, and generate a column selection signal corresponding to each bit line using the column address signal and the memory block enabling signal.

In some specific implementations, the control signal generation circuit may include a circuit formed by coupling the circuits in FIGS. 4a to 4e, and the control signal generation circuit may also include other sub-circuits. It should be noted that the same signal flags in FIGS. 4a to 4e need to be connected together. For example, the first timing control signal lypulse of the circuit in FIG. 4a can be connected to the first timing control signal lypulse of FIG. 4b. The generated third local control signal, (e.g., ldl_rd signal) can be a local data line read control signal, and the second local control signal ldl_rden can be a local data write and read control enabling signal, and the fourth local control signal ldl_wr signal can be a local data line write control signal.

In some implementations, the address enabling generation circuit may include circuits shown in FIG. 4f, with the number of circuits shown in FIG. 4f being the same as the number of bit lines contained in the memory block. The preliminary column decoding signal received by each circuit shown in FIG. 4f is different. The preliminary column decoding signal received by each circuit shown in FIG. 4f is any data bit of data bits in the first decoding signal AY_1<M−1:0> and any data bit of data bits in the second decoding signal AY_1<K−1:0> (e.g., such as AY_2<0> and AY_1<0> shown in FIG. 4f). Each circuit shown in FIG. 4f also needs to receive the memory block enabling signal Blk_en and the first timing control signal lypulse, and a column selection signal cls<n−1:0> (e.g., such as cls<n−1> shown in FIG. 4f) is output through the address enabling generation circuit shown in FIG. 4f.

It should be noted that here, K, M, and n are all positive integers, and n=M*K, n can be the same as the number of bits contained in a memory block, and the n data bits corresponding to cls<n−1:0> are respectively connected to a bit line in the memory block.

In some implementations, the peripheral circuit further includes, e.g., a sensing amplification circuit 206 and a local data line control circuit 207. The local data line control circuit 207 is coupled with the column decoder circuit 210. The local data line control circuit 207 is coupled with the sensing amplification circuit 206 through the local data line. The local data line control circuit 207 is configured to receive the local data line read control signal and the local data line write control signal. The local data line control circuit 207 controls the data interaction direction between the local data line and the global data line using the local data line read control signal and the local data line write control signal. The sensing amplification circuit 206 is coupled with the column decoder circuit 210 and the bit lines in the memory cell array. The column decoder circuit 210 is further configured to control data interaction between the local data line and the bit line using a column selection signal. The sensing amplification circuit 206 is configured to detect and amplify the voltage difference on the bit line.

Figure 6:
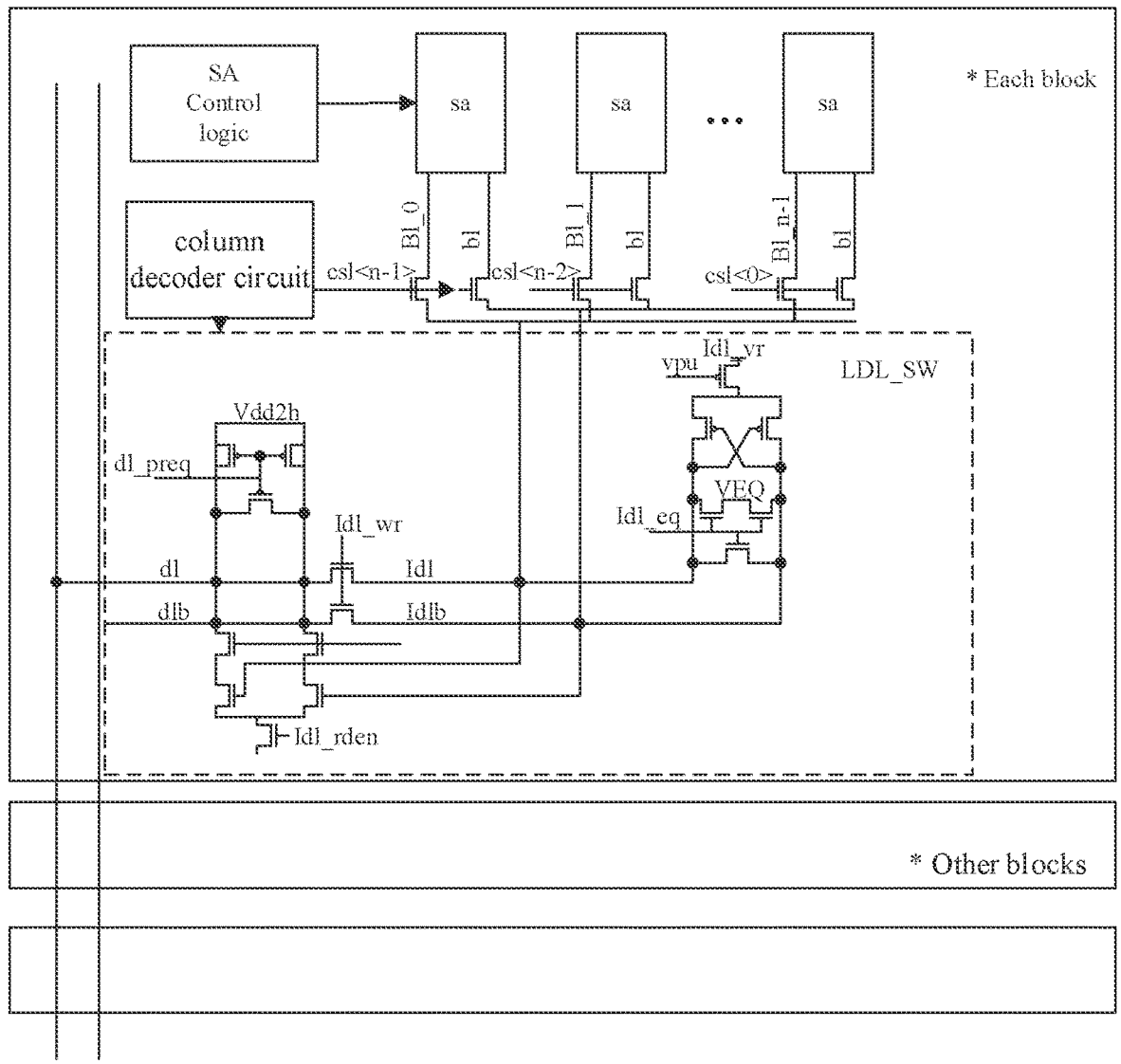
FIG. 6 is a schematic diagram of the connection relationship between the some composition circuits of some peripheral circuits corresponding to a memory block, according to some implementations of the present disclosure.

FIG. 5 is a schematic diagram of the connection relationship among some of the components of a peripheral circuit, according to some implementations. FIG. 6 is a schematic diagram of the connection relationship among some of the components of a part of the peripheral circuit corresponding to a memory block, according to some implementations. As shown in FIGS. 5 and 6, one memory block 204 can correspond to sensing amplification circuits (SAs) 206, and the column decoder circuits corresponding to one memory block 204 are respectively coupled to sensing amplification circuits 206 through bit lines Bl_n and complementary bit lines bl. Here, bit line Bl_n is the bit line where the memory cell on which the operation is to be performed is located, and on the complementary bit line bl, there is no memory cell on which the operation is to be performed.

As shown in FIGS. 5 and 6, the global data line in the peripheral circuit can include dlb and dl, while the local data line can include ldlb and ldl. As shown in the figures, each memory block 204 corresponds to an ldlb and an ldl. The ldlb is coupled to all the bit lines in the memory block 204 (Bl_0~Bl_n−1 in FIG. 6). The ldl is coupled to the complementary bit lines bl corresponding to respective bit lines in the memory block 204. The local data line is coupled to the local data line control circuit 207. The global data lines dlb and dl are respectively coupled to the ldlb and ldl through the local data line control circuit 207. One global data line dlb can be coupled with local data lines ldlb corresponding to memory blocks 204 for communication with bit line Bl_n; one global data line dl can be coupled with local data lines ldl corresponding to memory blocks 204 for communication with complementary bit lines bl. The sensing amplification circuit is coupled to the bit line Bl_n and the complementary bit line bl, the bit line Bl_n and the complementary bit line bl are coupled to the local data line control circuit 207 through a local data line. The local data line control circuit 207 responds to the local data line read control signal to control data to be transmitted from the bit line to the local data line and then to the global data line to feedback reading data to the host. The local data line control circuit 207 responds to the local data line write control signal to control data to be transmitted from the global data line to the local data line to perform a write operation on the memory cell. During the read or write operation, the column decoder responds to the relevant operation signal, generates a column selection signal cls<n−1:0>. Selects or opens the bit line or complementary bit line that needs to be operated on, and then the bit line or complementary bit line outputs the data to the local data line or obtains the data from the local data line.

Figure 7A:
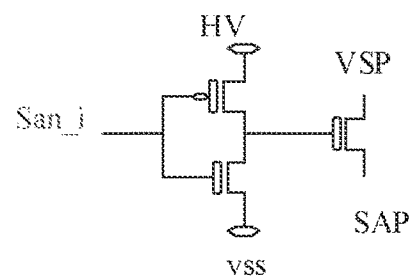
FIGS. 7a to 7c are schematic diagrams of the sensing amplification circuit control circuit, according to some implementations of the present disclosure.
Figure 7B:
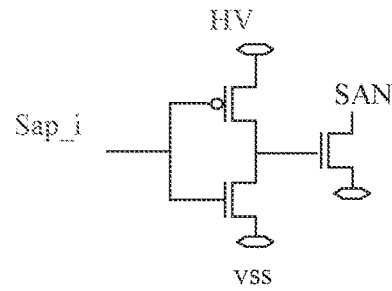
Figure 7C:
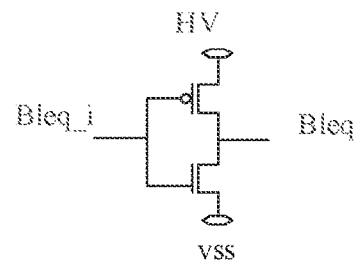

The peripheral circuit also includes a sensing amplification circuit control circuit (SA control logic) 205 coupled to sensing amplification circuits 206 to control the sensing amplification circuits 206. In some implementations, the sensing amplification circuit control circuit 205 may include the circuits shown in FIGS. 7a to 7c. The circuit in FIG. 7a can include a reverse circuit, with the output terminal of the reverse circuit being coupled to the control terminal of a transistor. When a signal San_i is input to the reverse circuit, the reverse circuit outputs a voltage with a level opposite to that of San_i to the control terminal of the transistor and turns on the transistor, and the output SAP signal is transmitted to the sensing amplification circuit 206. The circuit in FIG. 7b can include a reverse circuit, with the output terminal of the reverse circuit being coupled to the control terminal of a transistor. When a signal Sap_i is input to the reverse circuit, the reverse circuit outputs a voltage with a level opposite to that of Sap_i to the control terminal of the transistor and turns on the transistor, and the output SAN signal is transmitted to the sensing amplification circuit 206. The circuit in FIG. 7c can include a reverse circuit which, when being input with the signal Bleq_i, outputs Bleq with a level voltage opposite to that of Bleq_i and transmits it to the sensing amplification circuit 206.

Figure 8:
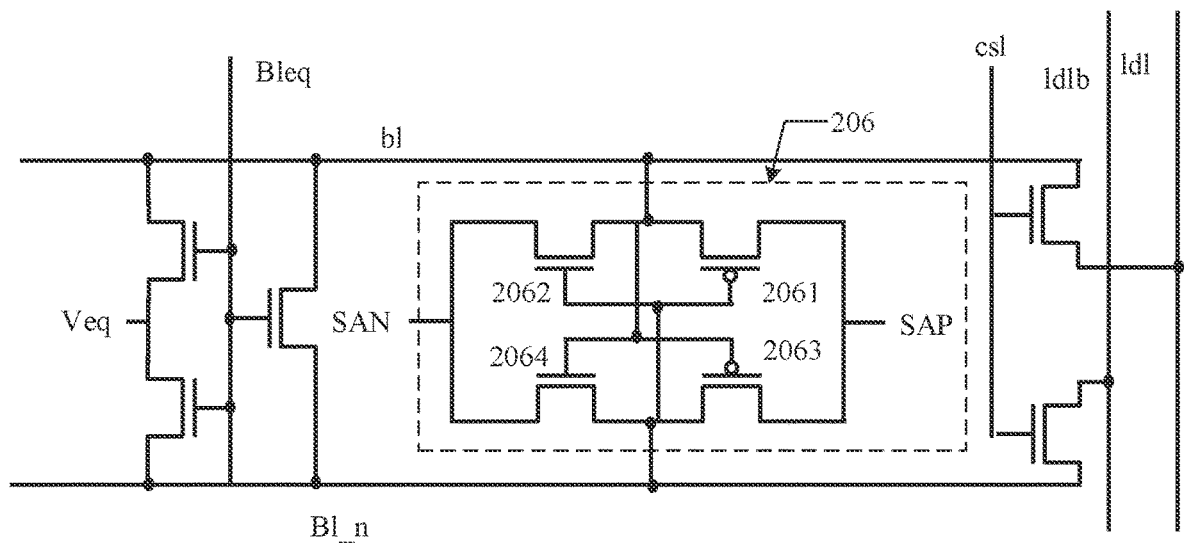
FIG. 8 is a schematic diagram of the coupling between the sensing amplification circuit and the bit line, according to some implementations of the present disclosure.

In some implementations, FIG. 8 shows a schematic diagram of the coupling of the sensing amplification circuit 206 to the bit line Bl_n and the complementary bit line bl. The sensing amplification circuit 206 can include four transistors, respectively a transistor 2061, a transistor 2062, a transistor 2063, and a transistor 2064. The transistor 2061 and the transistor 2063 are P-type transistors, and the transistor 2062 and the transistor 2064 are N-type transistors.

In some implementations, a read process includes a pre-charging operation, a charge sharing operation, a sensing operation, and a restore operation. When performing pre-charging operation, the word line is turned off, and after a period of time, the sensing amplification circuit 206 is turned off, causing the voltage on the bit line Bl_n to be stabilized at Vref, Vref=(½) vdd. After the precharging operation, it continues to the charge sharing operation, the word line is turned on, and the positive charge stored in the capacitor in the memory cell will flow to the bit line Bl_n. In this case, the voltage on the bit line Bl_n is pulled up to Vref+, a charge share occurs between the charge of the bit line Bl_n and the charge stored in the capacitor. Vref+ is for the case where the memory cell stores "1". When the memory cell stores "0", the voltage of the bit line Bl_n will be pulled down to Vref−, which is for the case where the memory cell stores "0".

After the voltage of the bit line Bl_n is pulled up to Vref+, it is easier for the first N-type transistor 2064 shown in FIG. 8 to be turned on than the second N-type transistor 2062, while it is easier for the first P-type transistor 2061 to be turned on than the second P-type transistor 2063. In the sensing operation, SAN can be the grounding voltage, and SAP can be a high-level voltage. It is easier for the first N-type transistor 2064 to be turned on than the second N-type transistor 2062, and the voltage on the complementary bit line bl is pulled to the grounding voltage faster by the SAN. Similarly, the voltage on the bit line Bl_n will be pulled to a high-level voltage faster by SAP. The first P-type transistor 2061 and the first N-type transistor 2064 are turned on, the second P-type transistor 2063 and the second N-type transistor 2062 are turned off, and the voltages on the bit line Bl_n and the complementary bit line bl enter a stable state, correctly presenting the information stored by the capacitor.

After completing the sensing operation, during the restoring operation, the bit line Bl_n is at a stable high-level voltage, at which point the bit line Bl_n will charge the capacitor, and after a period of time, the charge of the capacitor will restore to the state before the read operation. In the sensing operation, the column selection signal is controlled to make the column selection transistor on the bit line Bl_n enter a conduction state, and the information stored by the capacitor is output to the output line by the sensing amplification circuit 206, causing the external environment to read specific information on the capacitor from the bit line Bl_n.

In some implementations, some processes of the write operation of the memory cell are similar to the read operation, and also includes the write restoring operation, in addition to including the precharging operation, the charge sharing operation, the sensing operation, and the restoring operation in the read operation. During the write recovery operation, by controlling the write enabling signal, the write enabling transistor (not shown in FIG. 8) is turned on, and the bit line Bl_n will be pulled to the grounding voltage, while the complementary bit line bl will be pulled to the high-level voltage. After a certain period of time, the charge of the capacitor will be discharged to the 0 state, and then the word line will be controlled to turn off the transistor connected to the capacitor, completing the operation of writing 0. It should be pointed out that a write enable transistor is similar to a column selection transistor, where each bit line is coupled to a column selection transistor and a write enabling transistor, and the column selection transistor is coupled in series with the write enabling transistor. During the write restoring operation, the column selection transistor and the write enable transistor of the bit line Bl_n are turned on simultaneously.

In some implementations, the memory cell array is arranged on the first semiconductor structure 21, and the peripheral circuit is arranged on the second semiconductor structure 22; the first semiconductor structure 21 the second semiconductor structure 22 are stacked and electrically connected through bonding; the sense amplification circuit 206, the local data line control circuit 207, and the word line drive circuit corresponding to each decoding circuit 212 and each memory block 204 are all located at a position on the plane of the second semiconductor structure where the orthogonal projection of the corresponding memory block 204 is located.

Figure 9:
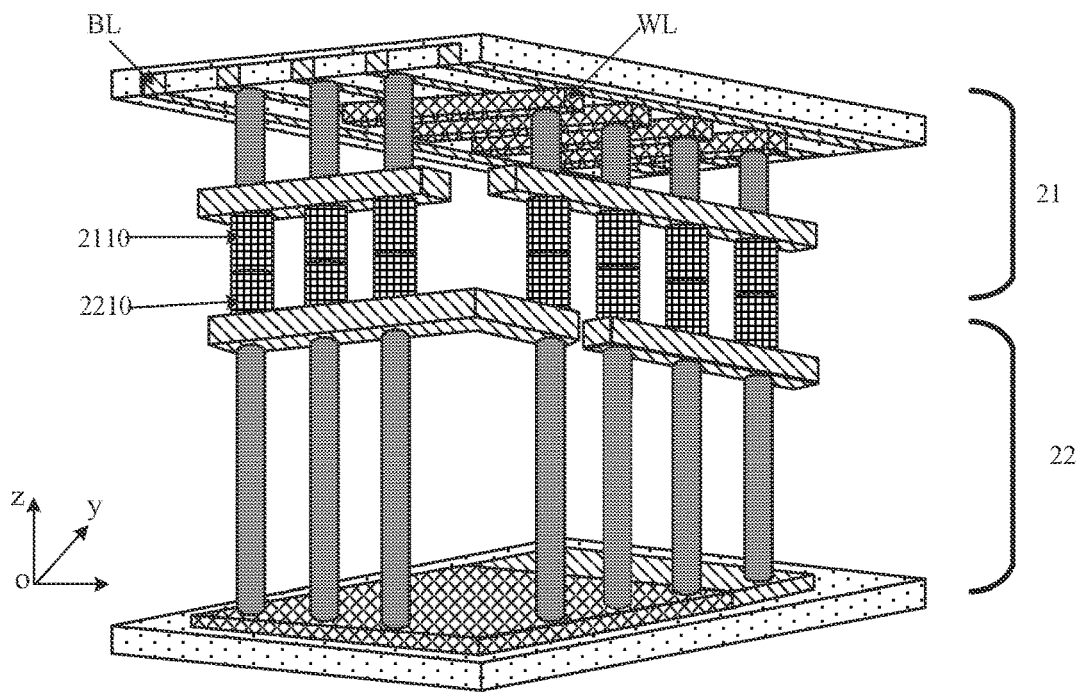
FIG. 9 is a schematic diagram of a memory cell array bonded to a peripheral circuit, according to some implementations of the present disclosure.

FIG. 9 shows a schematic diagram of the bonding connection between the first semiconductor structure 21 and the second semiconductor structure 22 through the first bonding contact 2110 and the second bonding contact 2210, with word and bit lines being shown in the figure as an example. The arrangement of the memory cell arrays, the word lines, and the bit lines can be shown as in FIG. 1.

Figure 10:
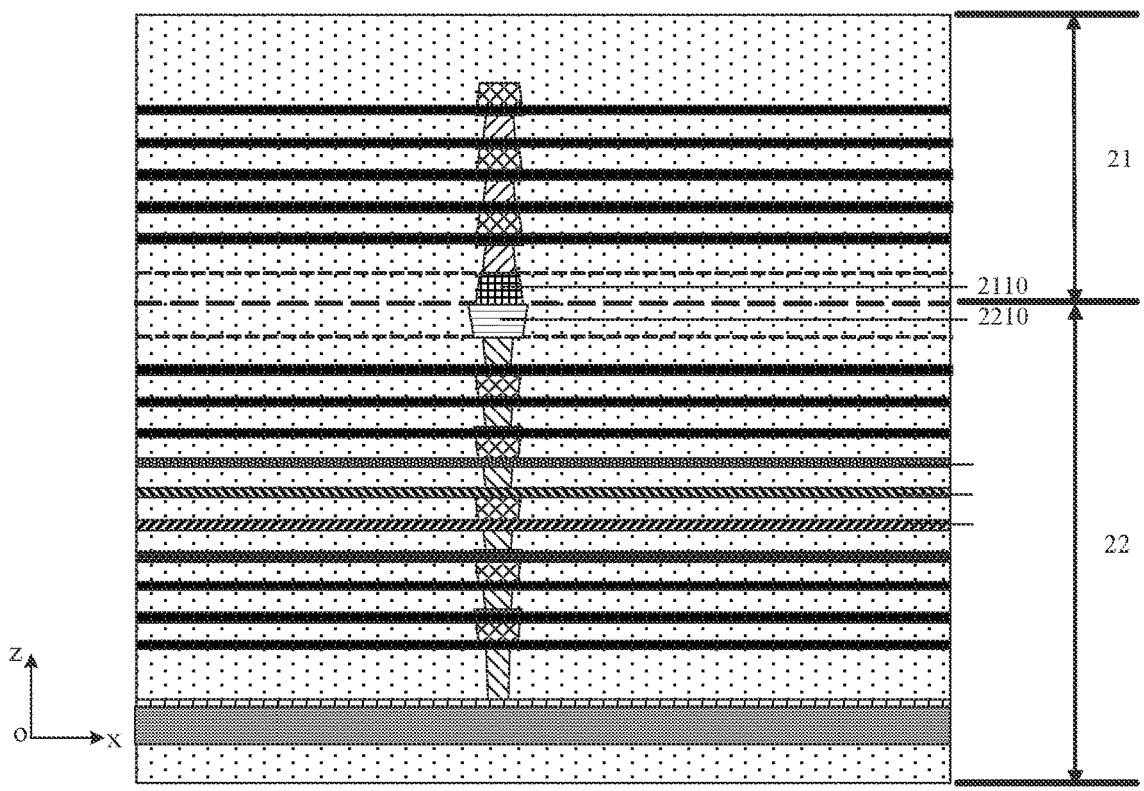
FIG. 10 is a first schematic diagram of a memory cell array bonded to a peripheral circuit, according to some implementations of the present disclosure.

As shown in FIG. 10, the first bonding layer is located on a surface of the side of the first semiconductor structure 21 in the negative z direction. The first bonding layer includes a first dielectric layer, and first bonding contacts 2110 penetrate through the first dielectric layer to couple to the wire layer in the first semiconductor structure 21, so as to lead out electrical signals of the device structures such as word lines and bit lines. The second bonding layer is located on a surface of the side of the second semiconductor structure 22 in the positive z direction, and the second bonding layer includes a second dielectric layer. The second bonding contacts 2210 penetrate through the second dielectric layer to couple with the wire layer in the second semiconductor structure 22, so as to lead out the electrical signal of the peripheral circuit. The first bonding contacts 2110 contact with the second bonding contacts 2210 through bonding to achieve telecommunications interconnection of the peripheral circuits and the memory cell array, and to achieve the control of the memory cell array by the peripheral circuits.

For example, the composition materials of the word line, the bit line, the first bonding contact 2110, the second bonding contact 2210, and the interconnection layer include conductive materials, e.g., such as copper, tungsten, gold, silver, titanium, nickel, etc. The composition materials of the first and second dielectric layers can include insulating materials such as silicon oxide, silicon nitride, silicon oxynitride, alumina, etc. The first and second dielectric layers can electrically isolate bonding contacts and provide a good flat surface for bonding surface, providing a larger bonding area and improving bonding adhesion.

It can be understood that in the first semiconductor structure 21 and the second semiconductor structure 22, there are multi-layer interconnection layers and conductive plugs stacked and mutually coupled to lead out electrical signals from a device structure with different levels of height.

In some implementations, during bonding, a first wafer including first semiconductor structures 21 and a second wafer including second semiconductor structures 22 may be bonded. Bonding can include hybrid bonding, where electrical signals are communicated between the two wafers through conductive bonding contacts, and an insulating dielectric layer provides electrical isolation and a larger bonding surface, improving bonding adhesion.

Figure 11:
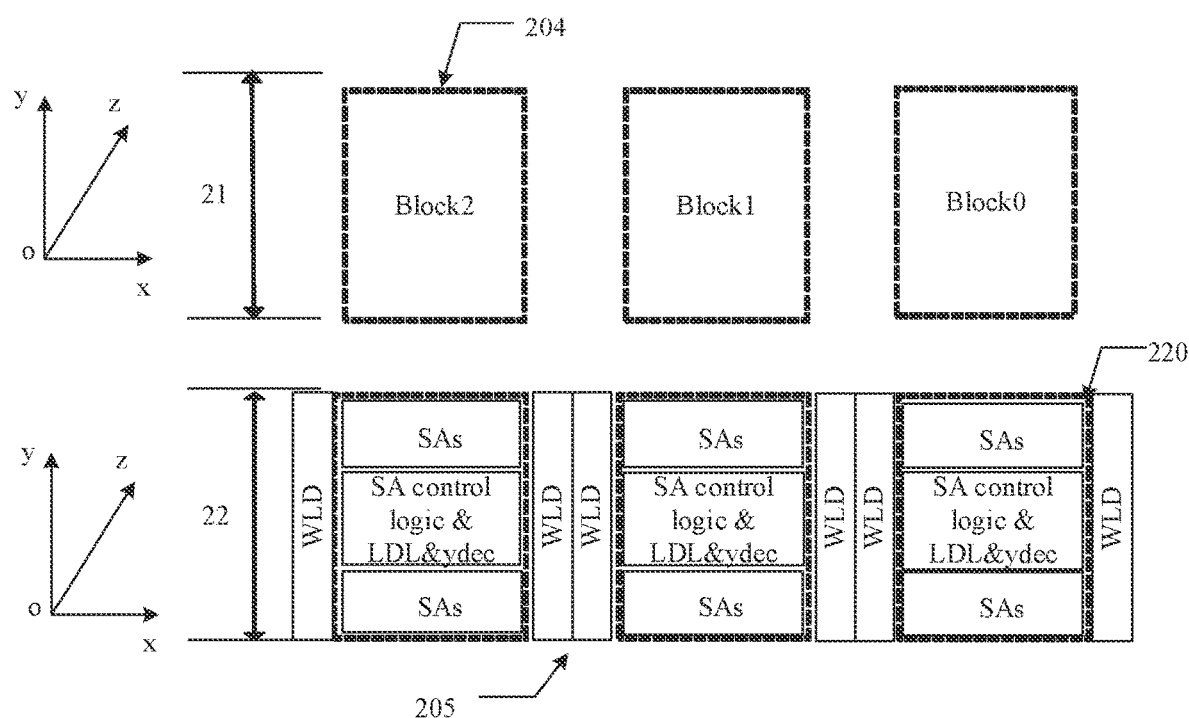
FIG. 11 is a schematic diagram of the layout of some peripheral circuits and memory blocks, according to some implementations of the present disclosure.

As shown in FIG. 11, a schematic diagram of the distribution, in the xoy plane, of some memory blocks 204 on the first semiconductor structure 21, and a schematic diagram of the distribution, in the xoy plane, of some peripheral circuits on the second semiconductor structure 22 corresponding to the memory block 204 are shown. A memory block 204 may correspond to the column decoder circuit ydec (including power supply control circuit 211 and decoding circuit 212), sensing amplification circuits (SAs), as well as the sensing amplification circuit control circuit (SA control logic) and the local data line control circuit (LDL_SW) shown in FIG. 5. Sensing amplification circuits can be arranged along the x direction, with the sensing amplification circuit control circuit, the column decoder circuit, and the local data line control circuit being located between two rows of sensing amplification circuits 206. The region of the second semiconductor structure 22 occupied by the two rows of sensing amplification circuits 206, and the sensing amplification circuit control circuit, the column decoder circuit, and the local data line control circuit therebetween can be referred to as a circuit block 220; and the area of the circuit block 220 can be equal or unequal to the area of the memory block 204. The peripheral circuit also includes a word line driver located between two adjacent circuit blocks 220 in the x direction and coupled to the word line of the corresponding memory block 204. After the first semiconductor structure 21 is bonded with the second semiconductor structure 22, the projection of the circuit block 220 on the xoy plane can overlap at least partially with the projection of the memory block 204 on the xoy plane.

In some implementations, the memory cell array includes memory banks 201 each including several row memory blocks 204 and several column memory blocks 204. The column decoder circuit 210 also includes a preliminary decoding circuit. The preliminary decoding circuit is configured to receive a preliminary column address signal. The preliminary decoding circuit is configured to perform decoding processing. The preliminary decoding circuit is configured to output the column address signal. The number of transmission lines corresponding to the preliminary column address signal is smaller than the number of transmission lines corresponding to the column address signal. Each memory bank 201 corresponds to preliminary decoding circuits, power supply control circuits 211, and decoding circuits 212, each preliminary decoding circuit corresponds to a column of memory blocks 204, and each power supply control circuit 211 and decoding circuit 212 corresponds to a memory block 204 in a column of memory blocks 204.

Figure 12:
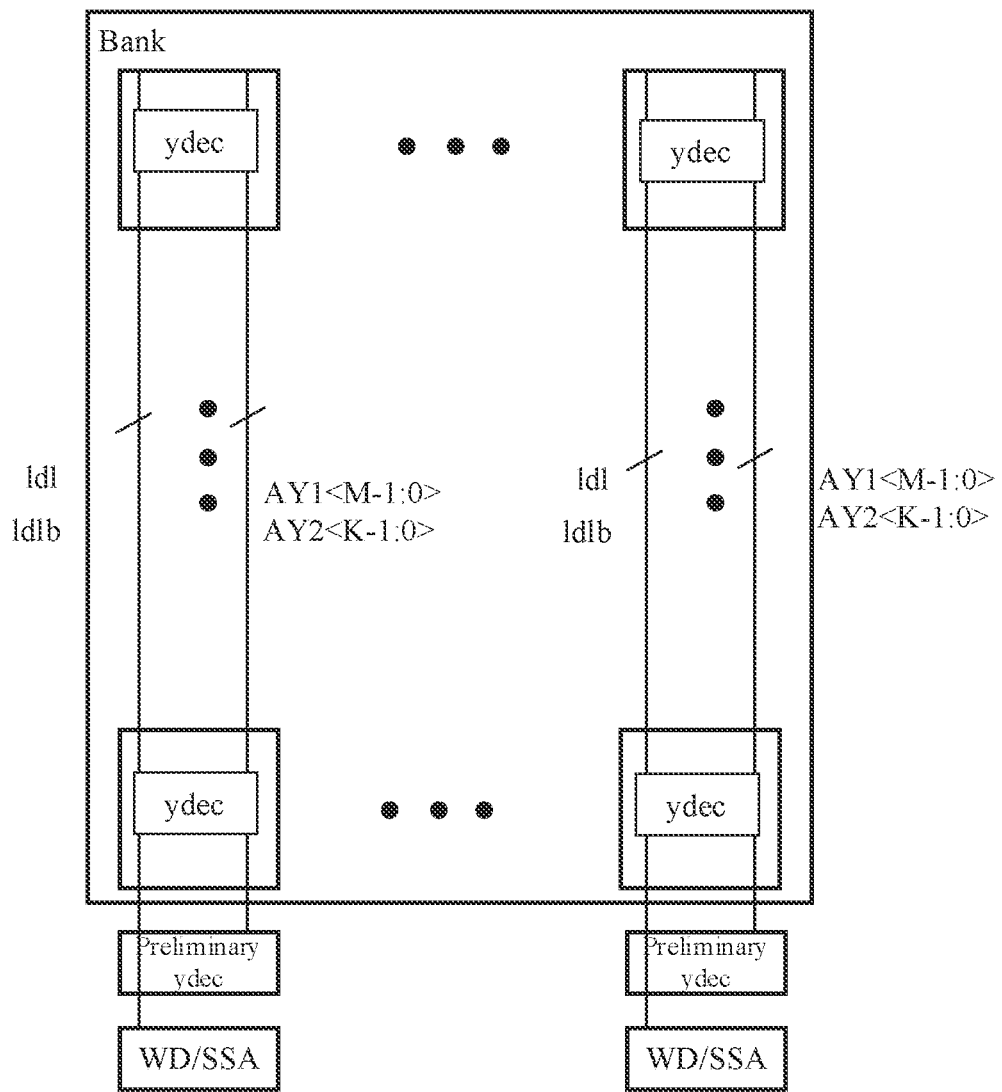
FIG. 12 is a top view schematic diagram of the distribution of memory blocks, preliminary column decoder circuits, and column decoder circuits in a memory body, according to some implementations of the present disclosure.

FIG. 12 is a top view schematic diagram of the distribution of the memory block, the preliminary column decoder circuit, and the column decoder circuit in the memory body shown, according to some implementations of the present disclosure. As shown in FIG. 12, a column decoder circuit 210 corresponds to a column of memory blocks, and a column decoder circuit 210 includes a preliminary decoding circuit (preliminary ydec) and power supply control circuits and decoding circuits (a power supply control circuit plus a decoding circuit being represented as ydec in FIG. 12) aforementioned. The number of the power supply control circuits plus the decoding circuits is the same as the number of the memory blocks in a column of memory blocks. The preliminary column address signal output by the preliminary decoding circuit includes the aforementioned first decoding signal AY_1<M−1:0> and the second decoding signal AY_1<K−1:0>.

In some implementations, the memory device includes a dynamic random access memory.

According to some aspects of the implementations of the present disclosure, a memory system 102 is provided. The memory system 102 may include, e.g., one or more memory devices 104 of the aforementioned implementations, and a memory controller 106, which is coupled to and controls the memory device 104.

Figure 13:
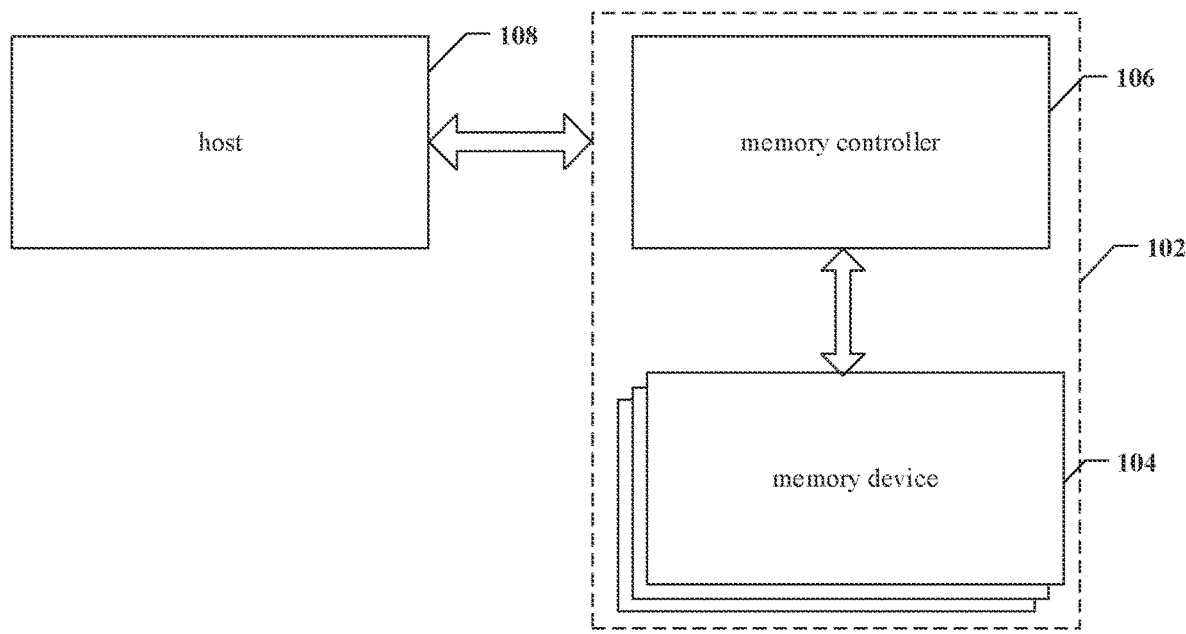
FIG. 13 is a first schematic diagram of a system including a memory device, according to some implementations of the present disclosure.

As shown in FIG. 13, a system 100 including a host is provided. The host 108 is coupled to a memory controller 106, and the memory controller 106 is coupled to one or more memory devices 104. The memory device 104 may include a DRAM, or a packaging structure formed by stacking DRAMs, such as an HBM or HMC packaging structure.

The memory system 102 can be used as a computer memory in the system 100 or as a buffer in the system 100.

In some implementations, the memory system 102 can be used as an auxiliary in a solid-state drive, which can bring improvement in reading and writing to the solid-state drive. At present, advanced solid-state drive products mostly choose to embed DRAM to improve product performance and improve random read and write speed. For example, when writing files, especially writing small files, the small files are processed by DRAM and then stored in Flash, making the solid-state drive have a higher storage efficiency and a faster speed. Flash includes a non-volatile memory, including but not limited to a 2D NAND memory or a 3D NAND memory.

Figure 14:
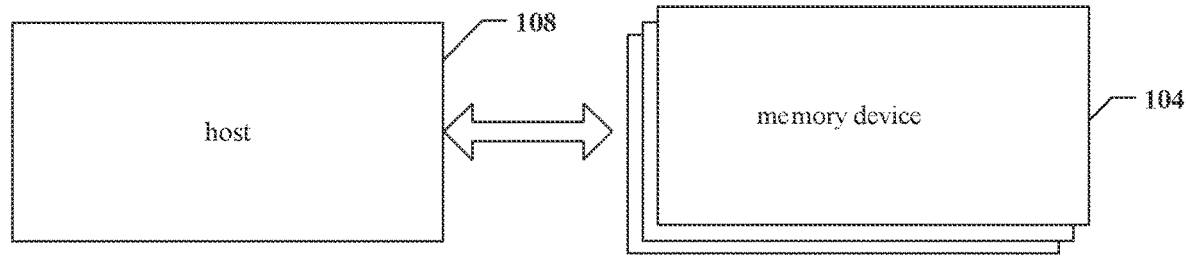
FIG. 14 is a second schematic diagram of a system including a memory device, according to some implementations of the present disclosure.

In other implementations, as shown in FIG. 14, the system 100 may only include the host 108 and a memory device 104 coupled therewith. The controller controlling the memory device 104 may be located inside the host 108, such as a memory controller integrated into the central processing unit (CPU), or a south or north bridge chip integrated into the system 100 motherboard. The memory device may include, but is not limited to, a dual data rate synchronous dynamic random access memory with DDR4-memory specifications or DDR5-memory specifications, and a low-power dual data rate synchronous dynamic random access memory with LPDDR5-memory specifications.

In some implementations provided in the present disclosure, it should be understood that the disclosed apparatus and methods can be implemented in a non-targeted way. The apparatus implementations described above are only schematic, for example, the division of the units is only a logical functional division, and there may be other division ways in actual implementation, for example, units or components can be combined or integrated into another system, or some features can be ignored or not executed. In addition, the various components shown or discussed are directly or indirectly coupled to each other.

Figure 15:
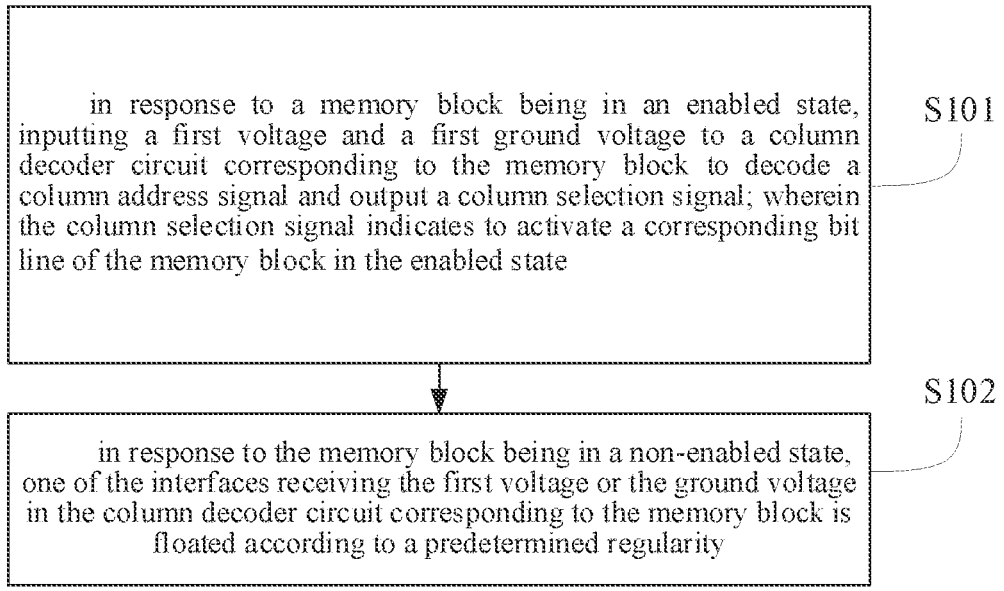
FIG. 15 is a schematic diagram of a control method for a memory device, according to some implementations of the present disclosure.

According to some aspects of the implementations of the present disclosure, FIG. 15 provides a control method for a memory device. The method may include operations S101 and S102.

For example, at S101, the method may include, in response to the memory block being in an enabled state, inputting a first voltage and a first ground voltage to the column decoder circuit corresponding to the memory block to decode the column address signal and output a column selection signal. The column selection signal indicates to activate a corresponding bit line in the memory block in the enabled state.

At S102, the method may include, in response to the memory block being in a non-enabled state, floating, according to a predetermined regularity, one of the interfaces receiving the first voltage or ground voltage in the column decoder circuit corresponding to the memory block.

Figure 16:
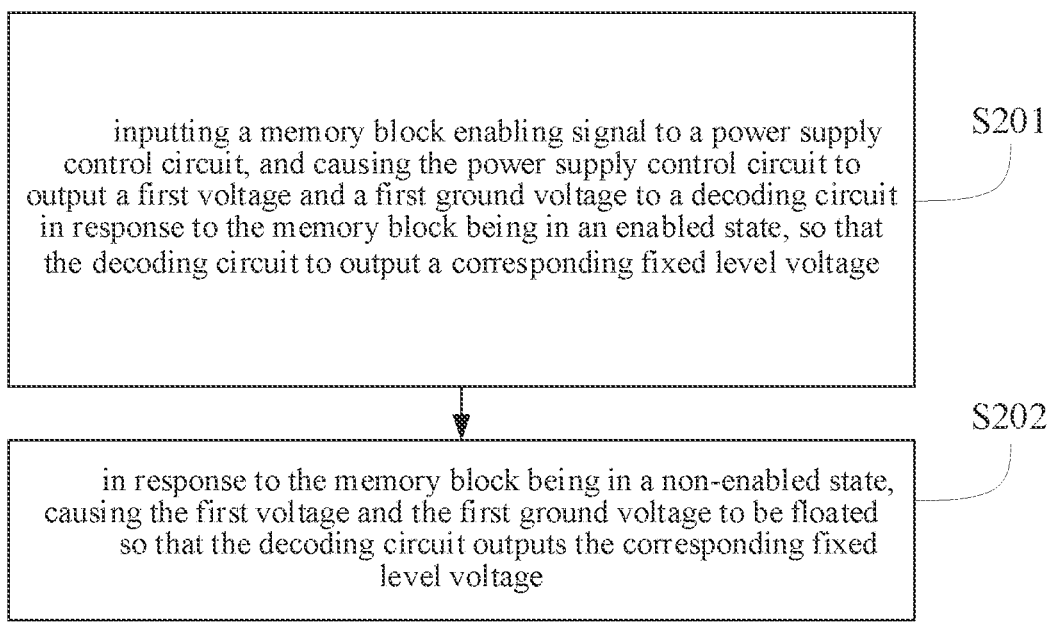
FIG. 16 is a schematic diagram of a control method for a decoder circuit in a memory device, according to some implementations of the present disclosure.

In some implementations, as shown in FIG. 16, the control method of the decoder circuit may include operations S201 and S202.

At S201, the method may include inputting the memory block enabling signal to the power supply control circuit, causing, in response to the memory block being in the enabled state, the power supply control circuit to output the first voltage and the first ground voltage to the decoding circuit, and causing the decoding circuit to output a corresponding fixed level voltage.

At S202, the method may include in response to the memory block being in the non-enabled state, floating the first voltage and the first ground voltage, and causing the decoding circuit to output the corresponding fixed level voltage.

The above is only a specific implementation of the present disclosure, but the scope of protection of the present disclosure is not limited thereto. Any changes or replacements that can be easily thought of by the technical personnel familiar with the technical field within the scope disclosed by the present disclosure should be covered within the scope of protection of the present disclosure. Therefore, the protection scope of the present disclosure should be based on the protection scope of the claims mentioned.

What is claimed is:

1. A decoder circuit, comprising:
a power supply control circuit comprising a first transistor, a second transistor, and a reverse circuit,
wherein an input terminal of the first transistor is connected to a low-level voltage node, and an output terminal of the first transistor outputs a first ground voltage,
wherein an input terminal of the second transistor is connected to a high-level voltage node, and an output terminal of the second transistor outputs a first voltage,
wherein an input terminal of the reverse circuit receives a semiconductor component enabling signal, and an output terminal of the reverse circuit is connected to a control terminal of one of the first transistor or the second transistor, and
wherein the control terminal of the first transistor or the second transistor that is not connected to the reverse circuit receives the semiconductor component enabling signal; and
a decoding circuit comprising sub-circuits,
wherein a power supply interface of one sub-circuit of the sub-circuits is connected to the output terminal of the second transistor, or a grounding interface of one sub-circuit of the sub-circuits is connected to the output terminal of the first transistor.

2. The decoder circuit of claim 1, wherein:
the sub-circuits comprise at least one of a first sub-circuit or a second sub-circuit,
an output interface of the first sub-circuit outputs a low-level voltage, the power supply interface of one sub-circuit of the sub-circuits is connected to the output terminal of the second transistor, and the grounding interface is connected to the low-level voltage node, and
the output interface of the second sub-circuit outputs a high-level voltage, the grounding interface of one sub-circuit of the sub-circuits is connected to the output terminal of the first transistor, and the power supply interface is connected to the high-level voltage node.

3. The decoder circuit of claim 1, wherein the first transistor is an N-type transistor, and the second transistor is a P-type transistor.

4. The decoder circuit of claim 1, wherein:
the control terminal of the second transistor is connected to the output terminal of the reverse circuit, and the control terminal of the first transistor receives the semiconductor component enabling signal, and
the semiconductor component enabling signal indicates that a semiconductor component is at a high-level voltage when the semiconductor component is in an enabled state.

5. The decoder circuit of claim 1, wherein:
the control terminal of the first transistor is connected to the output terminal of the reverse circuit, and the control terminal of the second transistor receives the semiconductor component enabling signal, and
the semiconductor component enabling signal indicates that a semiconductor component is at a low-level voltage when the semiconductor component is in an enabled state.

6. A memory device, comprising:
a memory cell array and a peripheral circuit coupled to the memory cell array,
wherein the memory cell array comprises a memory block which has word lines, bit lines and memory cells coupled between the word lines and the bit lines,
wherein the peripheral circuit comprises a column decoder circuit corresponding to the memory block and comprising sub-circuits, wherein the column decoder circuit is coupled to the bit lines in a corresponding memory block, and configured to receive a column address signal, decode the column address signal, and output a column selection signal,
wherein the column selection signal indicates to activate a corresponding bit line of the memory block in an enabled state, and
wherein during a decoding process, for the memory block in the enabled state, a power supply interface and a grounding interface of each sub-circuit of the sub-circuits in the column decoder circuit are both powered normally, and for the memory block in a non-enabled state, one of the power supply interface or the grounding interface of each sub-circuit of the sub-circuits in the column decoder circuit is floated according to a predetermined regularity.

7. The memory device of claim 6, wherein the column decoder circuit comprises:
a power supply control circuit comprising an input interface, a first output interface, and a second output interface,
wherein the input interface receives a memory block enabling signal, the first output interface outputs a first voltage, and the second output interface outputs a first ground voltage, and
wherein when the memory block enabling signal indicates that the memory block is in the enabled state, the first output interface is connected to a high-level voltage node, and the second output interface is connected to a low-level voltage node, and when the memory block enabling signal indicates that the memory block is in the non-enabled state, both the first voltage and the first ground voltage are floated, and
a decoding circuit comprising the sub-circuits, each of which comprises a power supply interface, a grounding interface, and an output interface,
wherein the power supply interface of each sub-circuit of the sub-circuits receives the first voltage or the grounding interface receives the first ground voltage, and the output interface of each sub-circuit of the sub-circuits outputs a corresponding fixed level voltage when the memory block enabling signal indicates that the memory block is in the non-enabled state.

8. The memory device of claim 7, wherein:
the power supply control circuit comprises a first transistor, a second transistor, and a reverse circuit,
an input terminal of the first transistor is connected to a low-level voltage node, and an output terminal of the first transistor outputs a first ground voltage,
an input terminal of the second transistor is connected to the high-level voltage node, and an output terminal of the second transistor outputs the first voltage,
an input terminal of the reverse circuit receives the memory block enabling signal, and an output terminal of the reverse circuit is connected to a control terminal of one of the first transistor or the second transistor, and the control terminal of one of the first transistor or the second transistor that is not connected to the reverse circuit receives the memory block enabling signal.

9. The memory device of claim 8, wherein:
the sub-circuits comprise at least one of a first sub-circuit or a second sub-circuit,
the output interface of the first sub-circuit outputs a low-level voltage, and the power supply interface of the first sub-circuit is connected to the output terminal of the second transistor, and a grounding interface of the first sub-circuit is connected to the low-level voltage node, and
the output interface of the second sub-circuit outputs a high-level voltage, and the grounding interface of the second sub-circuit is connected to the output terminal of the first transistor, and a power supply interface of the second sub-circuit is connected to the high-level voltage node.

10. The memory device of claim 8, wherein the first transistor is an N-type transistor, and the second transistor is a P-type transistor.

11. The memory device of claim 8, wherein:
the control terminal of the second transistor is connected to the output terminal of the reverse circuit, and the control terminal of the first transistor receives the memory block enabling signal, and
the memory block enabling signal indicates that the memory block is at a high-level voltage when the memory block is in the enabled state.

12. The memory device of claim 8, wherein:
the control terminal of the first transistor is connected to the output terminal of the reverse circuit, and the control terminal of the second transistor receives the memory block enabling signal, and
the memory block enabling signal indicates that the memory block is at a low-level voltage when the memory block is in the enabled state.

13. The memory device of claim 7, wherein:
the decoding circuit comprises a control signal generation circuit and an address enabling generation circuit,
the control signal generation circuit is coupled to the power supply control circuit, and is configured to generate at least a local data line read control signal and a local data line write control signal, and
the address enabling generation circuit is coupled to the power supply control circuit, and is configured to receive a column address signal and a memory block enabling signal and generate a column selection signal corresponding to each bit line using the column address signal and the memory block enabling signal.

14. The memory device of claim 13, wherein:
the peripheral circuit further comprises a sensing amplification circuit and a local data line control circuit,
the local data line control circuit is coupled with the column decoder circuit, is coupled with the sensing amplification circuit through a local data line, is configured to receive the local data line read control signal and the local data line write control signal, and controls a data interaction direction between the local data line and a global data line using the local data line read control signal and the local data line write control signal,
the sensing amplification circuit is coupled with the column decoder circuit and coupled with a bit line in the memory cell array, the column decoder circuit is further configured to control a data interaction between the local data line and the bit line using the column selection signal, and
the sensing amplification circuit is configured to detect and amplify a voltage difference on the bit line.

15. The memory device of claim 14, wherein:
the memory cell array is arranged on a first semiconductor structure, and the peripheral circuit is arranged on a second semiconductor structure,
the first semiconductor structure and the second semiconductor structure are stacked and electrically connected through bonding, and
each decoding circuit, and the sensing amplification circuit, the local data line control circuit, and a word line drive circuit corresponding to each memory block are all positioned at a position of an orthogonal projection of the corresponding memory block on a plane where the second semiconductor structure is at.

16. The memory device of claim 7, wherein:
the memory cell array comprises memory banks, each of which comprises several row memory blocks and several column memory blocks,
the column decoder circuit further comprises a preliminary decoding circuit configured to receive a preliminary column address signal, perform decoding processing, and output the column address signal,
a number of transmission lines corresponding to the preliminary column address signal is smaller than a number of transmission lines corresponding to the column address signal, and
each of the memory banks corresponds to preliminary decoding circuits, power supply control circuits, and decoding circuits, each preliminary decoding circuit corresponds to a column of memory blocks, and each power supply control circuit and decoding circuit correspond to a memory block in the column of memory blocks.

17. The memory device of claim 6, wherein the memory device comprises a dynamic random access memory.

18. A memory system, comprising:
one or more memory devices each comprising a memory cell array and a peripheral circuit coupled to the memory cell array,
wherein the memory cell array comprises a memory block which has word lines, bit lines and memory cells coupled between the word lines and the bit lines,
wherein the peripheral circuit comprises a column decoder circuit corresponding to the memory block and comprising sub-circuits,
wherein the column decoder circuit is coupled to the bit lines in a corresponding memory block, and configured to receive a column address signal, decode the column address signal, and output a column selection signal,
wherein the column selection signal indicates to activate a corresponding bit line of the memory block in an enabled state, and
wherein during a decoding process, for the memory block in the enabled state, a power supply interface and a grounding interface of each sub-circuit of the sub-circuits in the column decoder circuit are both powered normally, and for the memory block in a non-enabled state, one of the power supply interface or the grounding interface of each sub-circuit of the sub-circuits in the column decoder circuit is floated according to a predetermined regularity; and a memory controller that is coupled to and controls the one or more memory devices.

19. The memory system of claim 18, wherein the column decoder circuit comprises:
- a power supply control circuit comprising an input interface, a first output interface, and a second output interface,
  - wherein the input interface receives a memory block enabling signal, the first output interface outputs a first voltage, and the second output interface outputs a first ground voltage, and
  - wherein when the memory block enabling signal indicates that the memory block is in the enabled state, the first output interface is connected to a high-level voltage node, and the second output interface is connected to a low-level voltage node, and when the memory block enabling signal indicates that the memory block is in the non-enabled state, both the first voltage and the first ground voltage are floated, and
- a decoding circuit comprising the sub-circuits, each of which comprises a power supply interface, a grounding interface, and an output interface,
  - wherein the power supply interface of each sub-circuit of the sub-circuits receives the first voltage or the grounding interface receives the first ground voltage, and the output interface of each sub-circuit of the sub-circuits outputs a corresponding fixed level voltage when the memory block enabling signal indicates that the memory block is in the non-enabled state.

20. The memory system of claim 19, wherein:
the power supply control circuit comprises a first transistor, a second transistor, and a reverse circuit,
an input terminal of the first transistor is connected to a low-level voltage node, and an output terminal of the first transistor outputs a first ground voltage,
an input terminal of the second transistor is connected to the high-level voltage node, and an output terminal of the second transistor outputs the first voltage,
an input terminal of the reverse circuit receives the memory block enabling signal, and an output terminal of the reverse circuit is connected to a control terminal of one of the first transistor or the second transistor, and
the control terminal of one of the first transistor or the second transistor that is not connected to the reverse circuit receives the memory block enabling signal.

* * * * *